(12) United States Patent
Kim et al.

(10) Patent No.: US 10,374,860 B2
(45) Date of Patent: Aug. 6, 2019

(54) FILTER CONTROL APPARATUS AND METHOD FOR FILTER BANK MULTI-CARRIER TECHNIQUE IN WIRELESS COMMUNICATION SYSTEM

(71) Applicants: Samsung Electronics Co., Ltd., Gyeonggi-do (KR); INDUSTRY-ACADEMIC COOPERATION FOUNDATION, YONSEI UNIVERSITY, Seoul (KR)

(72) Inventors: Kyeongyeon Kim, Hwaseong-si (KR); Dong-Kyu Sim, Seoul (KR); Yong-Jin Ahn, Seoul (KR); Chung-Yong Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 15/576,678

(22) PCT Filed: May 24, 2016

(86) PCT No.: PCT/KR2016/005476
§ 371 (c)(1),
(2) Date: Nov. 22, 2017

(87) PCT Pub. No.: WO2016/190647
PCT Pub. Date: Dec. 1, 2016

(65) Prior Publication Data
US 2018/0139080 A1 May 17, 2018

(30) Foreign Application Priority Data
May 26, 2015 (KR) ......................... 10-2015-0072974

(51) Int. Cl.
*H04L 27/26* (2006.01)
*H04L 1/06* (2006.01)
(Continued)

(52) U.S. Cl.
CPC .......... *H04L 27/264* (2013.01); *H04L 1/0643* (2013.01); *H04L 1/1867* (2013.01);
(Continued)

(58) Field of Classification Search
CPC ..................................................... H04L 27/264
See application file for complete search history.

(56) References Cited

U.S. PATENT DOCUMENTS

2014/0233437 A1* 8/2014 Abdoli .................. H04L 5/0007
370/280
2015/0049836 A1* 2/2015 Li .......................... H04L 5/0048
375/295
(Continued)

FOREIGN PATENT DOCUMENTS

EP       1198903 81      5/2010
EP        2782304 A1     9/2014
(Continued)

OTHER PUBLICATIONS

Bellanger et al.; "FBMC Physical Layer: A Primer"; PHYDYAS, Jun. 2010; 31 pages.
(Continued)

*Primary Examiner* — Christopher M Brandt

(57) ABSTRACT

The present invention relates to a 5th generation (5G) or pre-5G communication system for supporting a data transmission rate higher than that of a 4th generation (4G) communication system such as long term evolution (LTE). The present invention relates to the transmission of a filter bank multi-carrier (FBMC) symbol in a wireless communication system, and a method for operating a transmission
(Continued)

terminal comprises the steps of: transmitting a first FBMC symbol generated by applying filters to subcarriers according to a first pattern; and transmitting a second FBMC symbol generated by applying the filters to the subcarriers according to a second pattern. In addition, the present invention also comprises examples different from the above mentioned example.

20 Claims, 26 Drawing Sheets

(51) Int. Cl.
*H04W 72/04* (2009.01)
*H04L 1/18* (2006.01)

(52) U.S. Cl.
CPC ..... *H04L 27/2646* (2013.01); *H04W 72/0406* (2013.01); *H04W 72/0453* (2013.01)

(56) References Cited

U.S. PATENT DOCUMENTS

| 2015/0063507 | A1* | 3/2015 | Dore | H04L 25/03159 |
| | | | | 375/348 |
| 2015/0110207 | A1 | 4/2015 | Murrin | |
| 2015/0358130 | A1* | 12/2015 | Chen | H04B 7/0413 |
| | | | | 375/267 |
| 2016/0269217 | A1 | 9/2016 | Nam et al. | |
| 2017/0099172 | A1* | 4/2017 | Ren | H04L 27/26 |
| 2017/0171010 | A1* | 6/2017 | Qu | H04L 27/34 |
| 2017/0332376 | A1* | 11/2017 | He | H04W 52/00 |

FOREIGN PATENT DOCUMENTS

| EP | 2843892 S1 | 3/2015 |
| KR | 20150035424 A | 4/2015 |
| WO | 2013173992 A1 | 11/2013 |

OTHER PUBLICATIONS

Tarokh et al.; "Space-Time Block Coding for Wireless Communications: Performance Results"; IEEE Journal on Selected Areas in Communications; vol. 17, No. 3, Mar. 1999; 10 pages.

Nam et al.; "A New Filter-Bank Multicarrier System for QAM Signal Transmission and Reception"; IEEE ICC 2014—Wireless Communications Symposium; Sydney, Australia; Jun. 10-14, 2014; 6 pages.

* cited by examiner

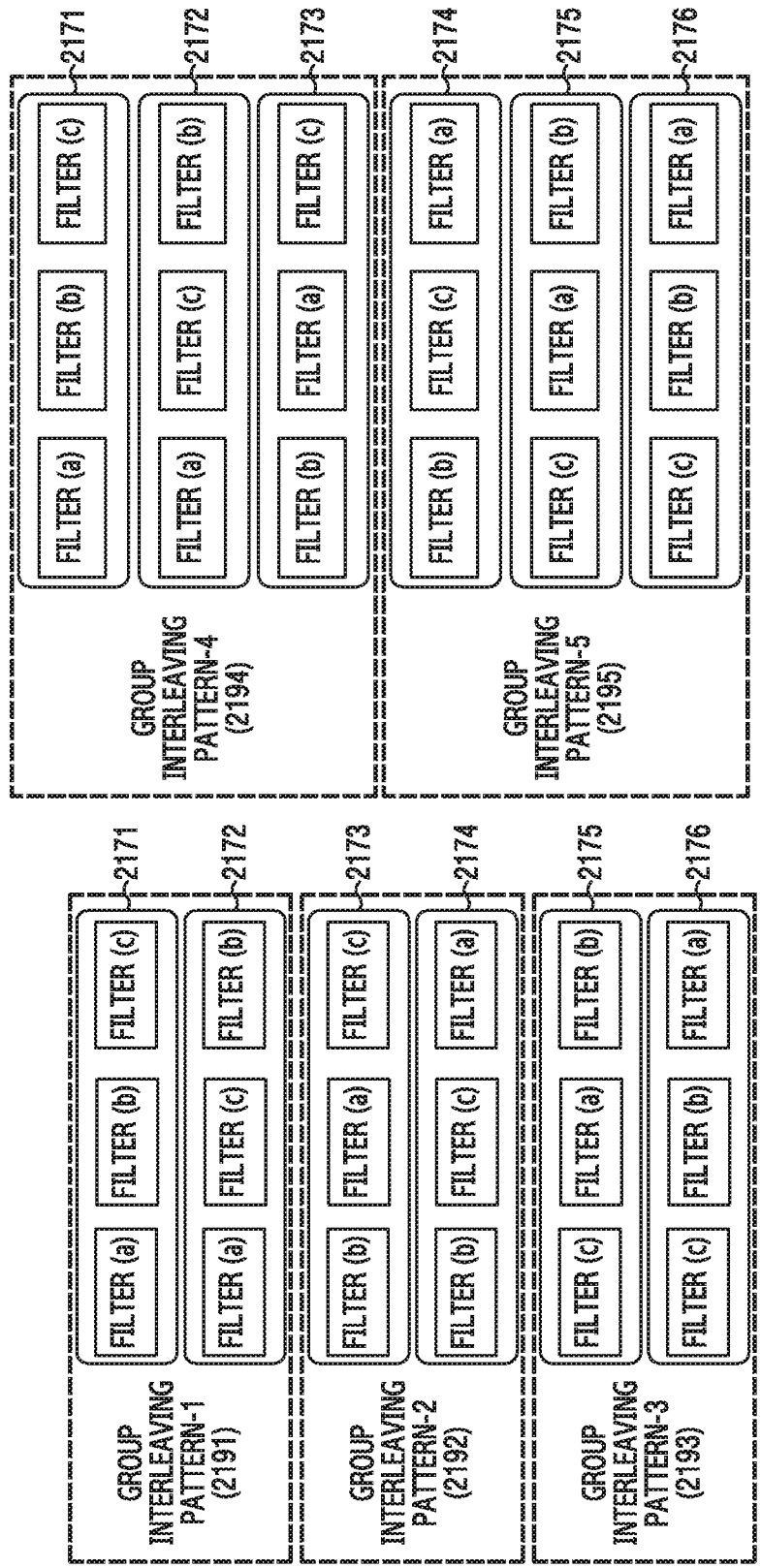

▨ : FIRST FILTER
☐ : SECOND FILTER

▨ : FIRST FILTER
☐ : SECOND FILTER

FILTER CONTROL APPARATUS AND METHOD FOR FILTER BANK MULTI-CARRIER TECHNIQUE IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2016/005476 filed May 24, 2016 and entitled "FILTER CONTROL APPARATUS AND METHOD FOR FILTER BANK MULE-CARRIER TECHNIQUE IN WIRELESS COMMUNICATION SYSTEM," which claims priority to Korean Patent Application No. 10-2015-0072974 filed on May 26, 2015. Each of that above-identified patent documents is incorporated by reference as if fully set forth herein.

TECHNICAL FIELD

The present invention relates to control of filters for Filter Bank Multi-Carrier (FBMC) technique in a wireless communication system.

BACKGROUND

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post Long Term Evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive Multiple Input Multiple Output (MIMO), Full Dimensional (FD)-MIMO, array antenna, analog beam-forming, and large scale antenna techniques.

Also, for network enhancement of the system, the 5G communication system is developing techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation.

Besides, the 5G system is working on hybrid Frequency Shift Keying and Quadrature Amplitude Modulation (FQAM) and Sliding Window Superposition Coding (SWSC) as Advanced Coding Modulation (ACM) schemes, and Filter Bank Multi Carrier (FBMC), Non Orthogonal Multiple Access (NOMA), and Sparse Code Multiple Access (SCMA) as advanced access technologies.

The FBMC is a scheme for generating a transmit symbol having out-of-band radiation using a filter bank. The FBMC can relatively reduce the number of guard subcarriers for satisfying the same spectrum mask, compared with Orthogonal Frequency Division Multiplexing (OFDM). Also, when the FBMC is applied, signal modulation/demodulation are enabled without a Cyclic Prefix (CP) and accordingly spectral efficiency is increased and characteristics robust to frequency synchronization error exhibit.

SUMMARY

One embodiment of the present invention provides an apparatus and a method for transmitting and receiving Filter Bank Multi-Carrier (FBMC) symbols in a wireless communication system.

Another embodiment of the present invention provides an apparatus and a method for controlling filters to generate and detect FBMC symbols in a wireless communication system.

Yet another embodiment of the present invention provides an apparatus and a method for interleaving filters for an FBMC scheme in a wireless communication system.

Still another embodiment of the present invention provides an apparatus and a method for changing a pattern of filters for an FBMC scheme in retransmission in a wireless communication system.

A further embodiment of the present invention provides an apparatus and a method for changing a pattern of filters for an FBMC scheme per symbol in a wireless communication system.

An operating method of a transmitting node in a wireless communication system according to an embodiment of the present invention includes transmitting a first Filter Bank Multi-Carrier (FBMC) symbol generated by applying filters to subcarriers in a first pattern, and transmitting a second FBMC symbol generated by applying the filters to the subcarriers in a second pattern.

An operating method of a receiving node in a wireless communication system according to an embodiment of the present invention includes receiving a first FBMC symbol generated by applying filters to subcarriers in a first pattern, and receiving a second FBMC symbol generated by applying the filters to the subcarriers in a second pattern.

An apparatus of a transmitting node in a wireless communication system according to an embodiment of the present invention includes a transmitting unit for transmitting a first FBMC symbol generated by applying filters to subcarriers in a first pattern, and transmitting a second FBMC symbol generated by applying the filters to the subcarriers in a second pattern.

An apparatus of a receiving node in a wireless communication system according to an embodiment of the present invention includes a receiving unit for receiving a first FBMC symbol generated by applying filters to subcarriers in a first pattern, and receiving a second FBMC symbol generated by applying the filters to the subcarriers in a second pattern.

By interleaving filters used to generate Filter Bank Multi-Carrier (FBMC) symbols in a wireless communication system, performance imbalance between subcarriers can be mitigated and diversity gain can be attained.

BRIEF DESCRIPTION OF DRAWINGS

FIGS. 21A and 21B depict an example of a group-interleaved filter sets for filter interleaving based STBC in a wireless communication system according to an embodiment of the present invention.

DETAILED DESCRIPTION

Hereinafter, an operational principle of the present invention is described in detail with reference to the accompanying drawings. In the following explanations, well-known functions or constitutions will not be described in detail if they would unnecessarily obscure the subject matter of the present invention. Also, terminologies to be described below are defined in consideration of functions in the present invention, and can vary depending on a user's or an operator's intention or practice. Thus, their definitions should be defined based on all the contents of the specification.

Hereinafter, the present invention provides transmission and reception techniques of Filter Bank Multi-Carrier (FBMC) symbols in a wireless communication system. Specifically, the present invention provides various embodiments for reducing a transmission time of the FBMC symbols.

Terms indicating signals or symbols, terms indicating signal processing means, terms indicating network entities, and terms indicating control information used in the following descriptions, are defined to ease the understanding. Accordingly, the present invention is not limited to those terms and can adopt other terms having technically equivalent meanings.

Figure 1:
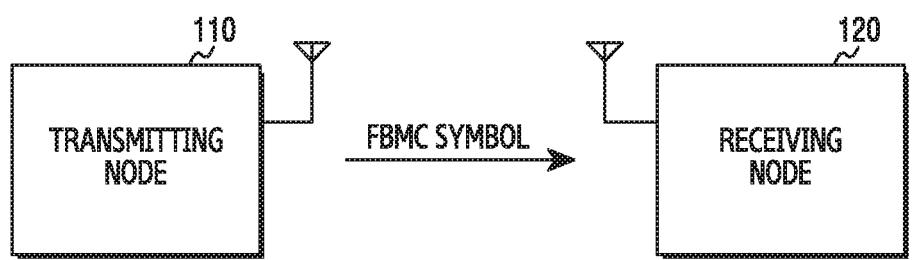
FIG. 1 depicts a transmitting node and a receiving node in a wireless communication system according to an embodiment of the present invention.

FIG. 1 depicts a transmitting node and a receiving node in a wireless communication system according to an embodiment of the present invention. Referring to FIG. 1, a transmitting node 110 transmits an FBMC symbol to a receiving node 120. That is, the wireless communication system according to an embodiment of the present invention employs an FBMC scheme, the transmitting node 110 generates at least one FBMC symbol, and the receiving node 120 analyzes at least one FBMC symbol. The transmitting node 110 and the receiving node 120 are distinguished relatively, and operate as the transmitting entity and the receiving entity of data at a particular time point. That is, the receiving node 120 can also transmit control information for the data reception, and transmit data in some cases.

The transmitting node 110 and the receiving node 120 each can be, as an electronic device, a user device or a network device. The user device can be referred to as a terminal, a mobile station, a user equipment, and so on, and the network device can be referred to as a base station, a nodeB, an evolved nodeB, and so on. For example, the transmitting node 110 and the receiving node 120 both can be terminals, or a terminal and a base station.

Figure 2:
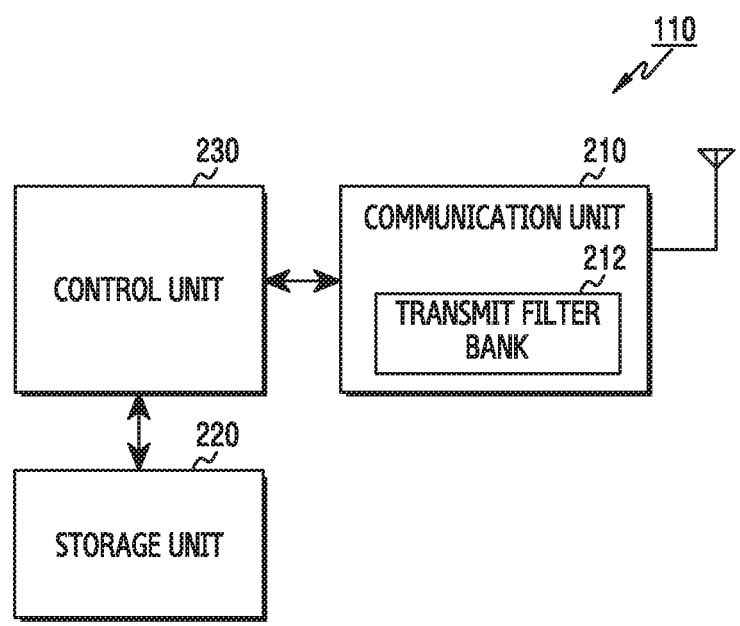
FIG. 2 depicts a block diagram of a transmitting node in a wireless communication system according to an embodiment of the present invention.

FIG. 2 depicts a block diagram of a transmitting node in a wireless communication system according to an embodiment of the present invention. Hereafter, a term such as "unit" and "part" indicates a unit for processing at least one function or operation, and can be implemented using hardware, software, or a combination of hardware and software.

Referring to FIG. 2, the transmitting node 110 includes a communication unit 210, a storage unit 220, and a control unit 230.

The communication unit 210 performs functions for sending and receiving signals over a radio channel. For example, the communication unit 210 performs a conversion function between a baseband signal and a bit string according to a physical layer standard of the system. For example, for data transmission, the communication unit 210 generates complex symbols by encoding and modulating a transmit bit string. Also, in data reception, the communication unit 210 restores a receive bit string by demodulating and decoding a baseband signal. Also, the communication unit 210 up-converts the baseband signal to a Radio Frequency (RF) band signal, transmits it via an antenna, and down-converts an RF band signal received via the antenna to a baseband signal. In particular, the communication unit 210 includes a transmit filter bank 212 for generating an FBMC symbol. Further, the communication unit 210 can include a transmit filter, a receive filter, an amplifier, a mixer, an oscillator, a Digital to Analog Convertor (DAC), an Analog to Digital Convertor (ADC), and the like.

Also, the communication unit 210 can include a plurality of RF chains. Further, the communication unit 210 can conduct beamforming. For the beamforming, the communication unit 210 can adjust a phase and a magnitude of signals transmitted and received via a plurality of antennas or antenna elements. Further, the communication unit 210 can include a plurality of communication modules to support a plurality of different radio access technologies. The communication unit 210 sends and receives the signals as above. Hence, the communication unit 210 can be referred to as a transmitting unit, a receiving unit, or a transceiving unit.

The storage unit 220 stores a basic program for operating the transmitting node 110, an application program, and data such as setting information. In particular, the storage unit 220 can store data for signaling with the receiving node 120, that is, data for analyzing a message from the receiving node 120. Also, the storage unit 220 provides the stored data according to a request of the control unit 230.

The control unit 230 controls general operations of the transmitting node 110. For example, the control unit 230 sends and receives signals through the communication unit 210. Also, the control unit 230 records and reads data in and from the storage unit 220. For doing so, the control unit 230 can include at least one processor. For example, the control unit 230 can include a Communication Processor (CP) for controlling the communication and an Application Processor (AP) for controlling a higher layer such as an application program. According to an embodiment of the present invention, the control unit 230 can determine a shift pattern of FBMC symbols, and transmit selectively shifted FBMC symbols according to the determined shift pattern. For example, the control unit 230 can control the transmitting node 110 to perform FBMC symbol transmission processes to be explained.

Figure 3:
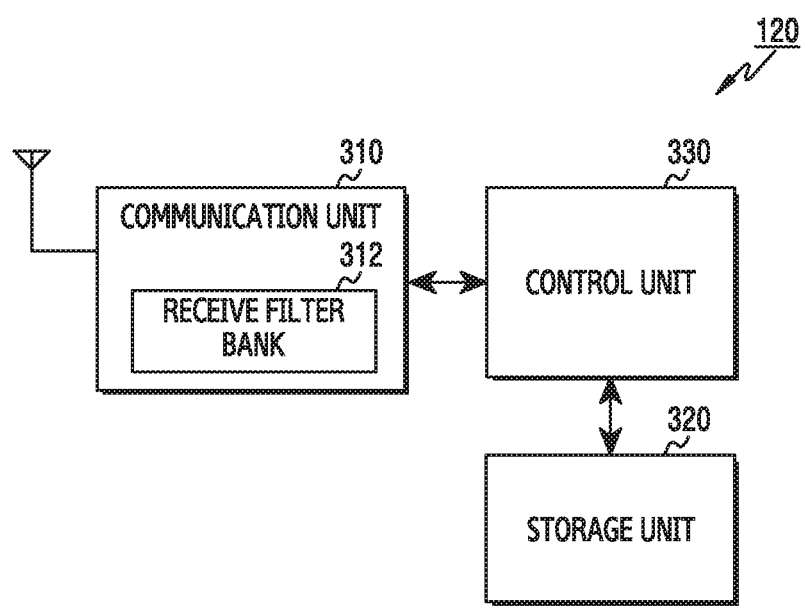
FIG. 3 depicts a block diagram of a receiving node in a wireless communication system according to an embodiment of the present invention.

FIG. 3 depicts a block diagram of a receiving node in a wireless communication system according to an embodiment of the present invention. Hereafter, a term such as "unit" and "part" indicates a unit for processing at least one function or operation, and can be implemented using hardware, software, or a combination of hardware and software.

Referring to FIG. 3, the receiving node 120 includes a communication unit 310, a storage unit 320, and a control unit 330.

The communication unit 310 performs functions for sending and receiving signals over a radio channel. For example, the communication unit 310 performs a conversion function between a baseband signal and a bit string according to a physical layer standard of the system. For example, for data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. In particular, the communication unit 310 includes a receive filter bank 312 for analyzing an FBMC symbol. Further, the communication unit 310 can include a transmit filter, a receive filter, an amplifier, a mixer, an oscillator, a DAC, an ADC, and the like.

Also, the communication unit 310 can include a plurality of RF chains. Further, the communication unit 310 can conduct beamforming. For the beamforming, the communication unit 310 can adjust a phase and a magnitude of signals transmitted and received via a plurality of antennas or antenna elements. Further, the communication unit 310 can include a plurality of communication modules to support a plurality of different radio access technologies. The communication 310 sends and receives the signals as above. Hence, the communication unit 310 can be referred to as a transmitting unit, a receiving unit, or a transceiving unit.

The storage unit 320 stores a basic program for operating the receiving node 120, an application program, and data such as setting information. In particular, the storage unit 320 can store data for signaling with the transmitting node 110, that is, data for analyzing a message from the transmitting node 110. Also, the storage unit 320 provides the stored data according to a request of the control unit 330.

The control unit 330 controls general operations of the receiving node 120. For example, the control unit 330 sends and receives signals through the communication unit 310. Also, the control unit 330 records and reads data in and from the storage unit 220. For doing so, the control unit 330 can include at least one processor. For example, the control unit 330 can include a CP for controlling the communication and an AP for controlling a higher layer such as an application program. According to an embodiment of the present invention, the control unit 330 can receive selectively shifted FBMC, and analyze the FBMC symbols based on a shift pattern of the FBMC symbols. For example, the control unit 330 can control the receiving node 120 to perform FBMC symbol transmission processes to be explained.

Figure 4:
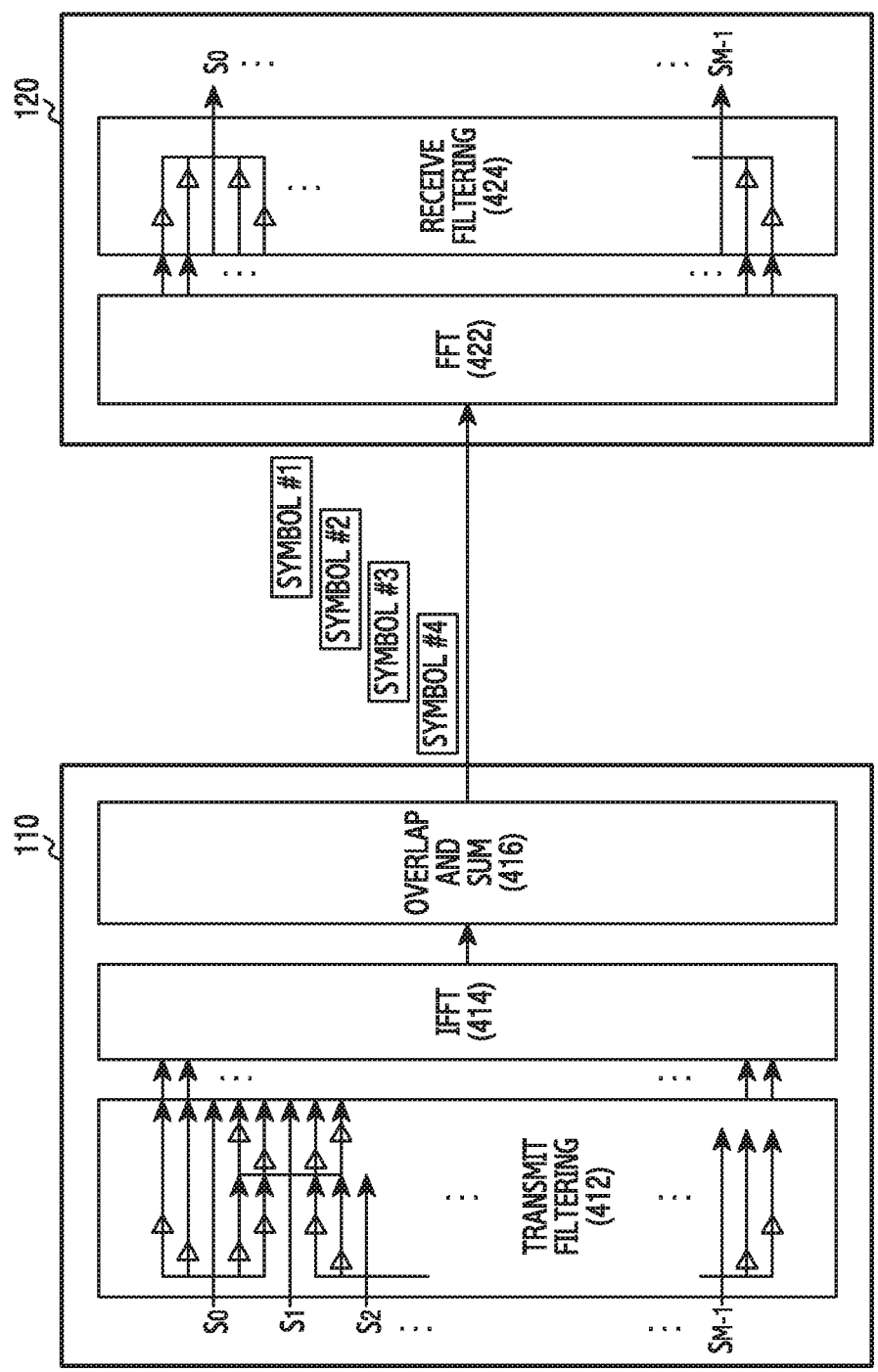
FIG. 4 depicts an example of a functional structure of a transmitting node and a receiving node for generating and analyzing Filter Bank Multi-Carrier (FBMC) symbols in a wireless communication system according to an embodiment of the present invention.

FIG. 4 depicts an example of a functional structure of a transmitting node and a receiving node for generating and analyzing FBMC symbols in a wireless communication system according to an embodiment of the present invention. FIG. 4 illustrates a case where filtering is conducted in a frequency domain. Hereafter, a term such as "unit" and "part" indicates a unit for processing at least one function or operation, and can be implemented using hardware, software, or a combination of hardware and software.

Referring to FIG. 4, the transmitting node 110 includes a transmit filtering module 412, an Inverse Fast Fourier Transform (IFFT) module 414, and an overlap and sum module 416. The receiving node 120 includes an FFT module 422 and a receive filtering module 424.

The transmit filtering module 412 corresponds to the transmit filter bank 212 of FIG. 2. The transmit filtering module 412 oversamples and filters data symbols $S_0$ through $S_{M-1}$. In FIG. 4, while a filter order K is 2 and an oversampling factor is 5(=2×K+1), other filter order and other oversampling factor can be applied. For example, in case of $S_0$, the transmit filtering module 412 generates the same sample values as five $S_0$ values by oversampling $S_0$, and multiples the five sample values by filter coefficients. Similarly, the transmit filtering module 412 oversamples and multiples $S_1$ through $S_{M-1}$ by the filter coefficients. In so doing, some of the filtered samples of adjacent data symbols are summed up. In so doing, one of the adjacent data symbols can be divided into a real value and an imaginary value of a complex symbol, or different filters can be applied to the adjacent data symbols so that the receiving node 120 can decompose the summed sampling values.

The IFFT module 414 performs an IFFT operation on the samples of the filtered data symbols output from the transmit filtering module 412. That is, the IFFT module 414 generates an FBMC symbol including $S_0$ through $S_{M-1}$ using the samples of the filtered data symbols. Namely, the IFFT module 414 generates a multi-carrier signal through the IFFT operation. In so doing, since the data symbol is oversampled to $S_0$ through $S_{M-1}$, a length of the FBMC symbol is greater than the number n of the data symbols. The overlap and sum module 416 partially overlaps and sums the FBMC symbols generated by the IFFT module 414. The FBMC symbols are not transmitted independently on a time axis, but are transmitted overlappingly. More specifically, a rear end of a first FBMC symbol and a front end of a second FBMC symbol overlap. That is, the overlap and sum module 416 generates a transmit signal by arranging the FBMC symbols at predefined intervals and summing samples of the FBMC symbols on the same time. Herein, the predefined intervals can be the number n of the data symbols.

Although not depicted in FIG. 4, the transmitting node 110 can further include at least one module for transmitting the transmit signal generated by the overlap and sum module 416. The transmit signal generated by the overlap and sum module 416 is a digital baseband signal. Accordingly, the transmitting node can further include at least one module for converting a transmit signal to an analog signal and up-converting to an RF signal. Next, the transmit signal including the FBMC symbols can be received at the receiving node 120. Similarly, the receiving node 120 can further include at least one module for converting the received signal to a digital baseband signal.

The FFT module 422 performs an FFT operation on the received signal. In so doing, the FFT module 422 extracts samples corresponding to one FBMC symbol length from the received signal generated by the overlap and the sum on the FBMC symbols, and conducts the FFT operation. The receive filtering module 424 filters samples corresponding to one FBMC symbol provided from the FFT module, and conducts downsampling. Hence, the data symbols $S_0$ through $S_{M-1}$ can be restored. For example, to recover $S_0$, the receive filtering module 424 multiples five samples of the samples of the FFT-operated receive signal by the filtering factors, and sums them.

Figure 5:
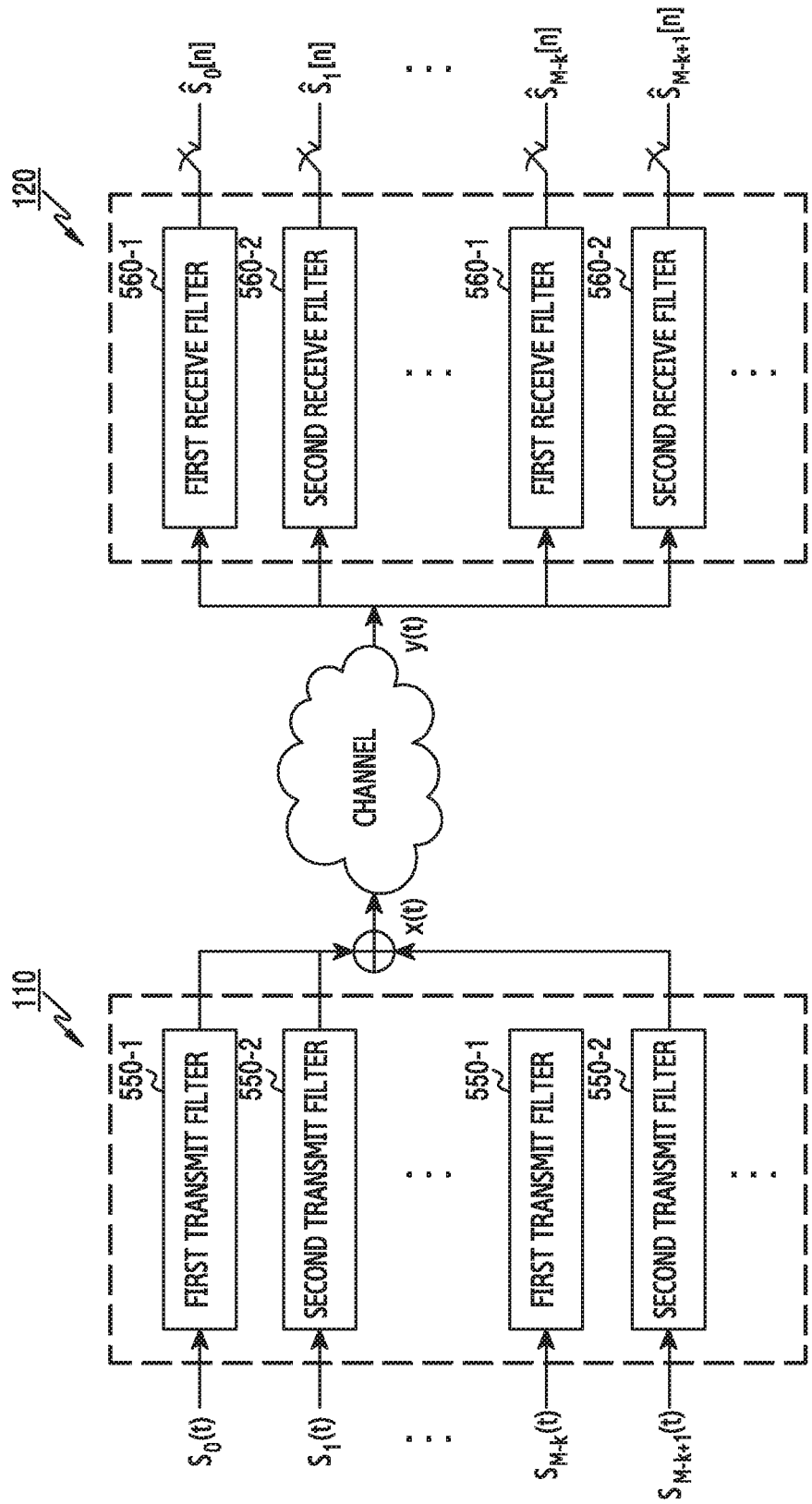
FIG. 5 depicts a structure of a filter for generating and detecting FBMC symbols in a wireless communication system according to an embodiment of the present invention.

FIG. 5 depicts a structure of a filter for generating and detecting FBMC symbols in a wireless communication system according to an embodiment of the present invention. FIG. 5 illustrates a case where a plurality of different filters is used.

Referring to FIG. 5, the transmitting node 110 filters data symbols $S_0(t)$ through $S_{M-1}(t)$ using a plurality of filters (e.g., the transmit filter bank 212), and generates a transmit signal x(t) from the filtered symbols. For example, the signal x(t) can be generated through the IFFT operation and the overlap and sum on the filtered symbols. The signal x(t) is distorted in passing through channel, and the receiving node 120 receives a signal y(t). The receiving node 120 restores data symbols $\hat{S}_0[n]$ through $\hat{S}_{M-1}[n]$ from the signal y(t) through a plurality of filters (e.g., the receive filter bank 312).

In so doing, the transmitting node 110 uses the different filters including a first transmit filter 550-1 and a second transmit filter 550-2 for the data symbols to be mapped to adjacent subcarriers. Likewise, the receiving node 120 uses the different filters including a first receive filter 560-1 which is a matched filter for the first transmit filter 550-1 and a second receive filter 560-2 which is a matched filter for the second transmit filter 550-2 with respect to the data symbols mapped to the adjacent subcarriers. Hence, a complex symbol including both of a real value and an imaginary value can be mapped to each subcarrier. For doing so, the filters used for the adjacent subcarriers, for example, the first transmit filter 550-1 and the second transmit filter 550-2 need to have orthogonality to cancel intrinsic interference. When two filters (e.g., a first filter 551 and a second filter 552) are used, one filter can be applied to subcarriers of an odd index and the other filter can be applied to subcarriers of an even index.

As shown in FIG. 5, by using the filters having the orthogonality, efficient data transmission without the interference between the subcarriers is enabled. Specifically, the complete complex symbol (e.g., Quadrature Amplitude Modulation (QAM)) without the separation of the real value and the imaginary value can be transmitted over each subcarrier. However, when the multiple filters, for example, two filters are designed to have the orthogonality, any one filter can be subject to frequency confinement characteristic degradation. In this case, a sidelobe size increases in the frequency domain, and inter-subcarrier Bit Error Rate (BER) performance difference can be caused.

Accordingly, the present invention provides various embodiments for mitigating the adverse effect due to the filter of the relatively poor performance used in a particular subcarrier. Specifically, according to various embodiments of the present invention, the transmitting node 110 and the receiving node 120 use a plurality of filters but change correspondence of the subcarriers and the filters on a periodic basis or on a predefined condition. That is, the transmitting node 110 and the receiving node 120 can change a mapping pattern or a mapping rule for the subcarriers of the filters. Hereafter, to ease the understanding, changing the mapping pattern or the mapping rule of the filters can be referred to as filter interleaving.

Figure 6:
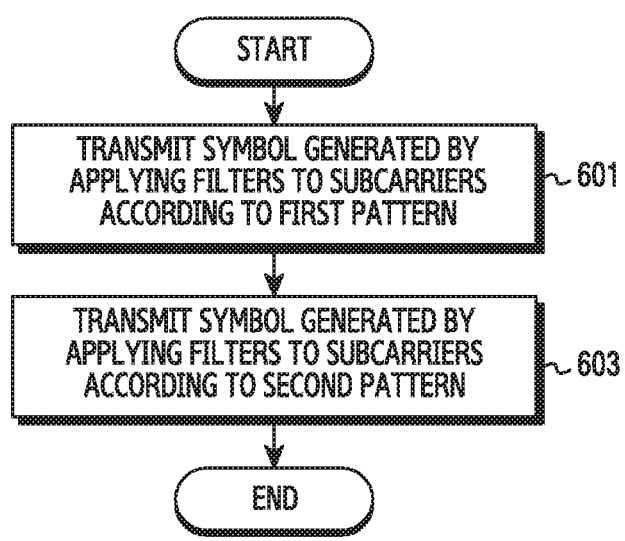
FIG. 6 depicts an operating process of a transmitting node in a wireless communication system according to an embodiment of the present invention.

FIG. 6 depicts an operating process of a transmitting node in a wireless communication system according to an embodiment of the present invention. FIG. 6 illustrates an operating method of the transmitting node 110.

Referring to FIG. 6, the transmitting node 110 transmits a symbol generated by applying filters to subcarriers according to a first pattern in operation 601. In other words, the transmitting node 110 transmits the symbol generated using the filters arranged in the first pattern with respect to the subcarriers. Herein, the symbol indicates an FBMC symbol. For example, the transmitting node 110 uses a plurality of filters including a first filter and a second filter. In so doing, the transmitting node 110 can filter a symbol to be mapped to a first subcarrier using the first filter and filter a symbol to be mapped to a second subcarrier using the second filter by applying the first filter to the first subcarrier and the second filter to the second subcarrier, generate the FBMC symbol from the filtered symbols, and transmit the FBMC symbol.

Next, the transmitting node 110 transmits the symbol generated by applying the filters to the subcarriers in a second pattern in operation 603. In other words, the transmitting node 110 transmits other symbol generated through filters arranged in the second pattern with respect to the subcarriers. That is, in a next time slot, the transmitting node 110 changes the mapping pattern of the filters to the second pattern. Hence, in the symbol transmitted in operation 601 and the symbol transmitted in operation 603, the filter applied to at least one carrier is different. That is, different filters can be applied to all the subcarriers between two symbols, or different filters can be applied to some subcarrier. For example, the transmitting node 110 can filter the symbol to be mapped to the first subcarrier using the second filter and filter the symbol to be mapped to the second subcarrier using the first filter by applying the second filter to the first subcarrier and the first filter to the second subcarrier, generate the FBMC symbol from the filtered symbols, and transmit the FBMC symbol.

Figure 7:
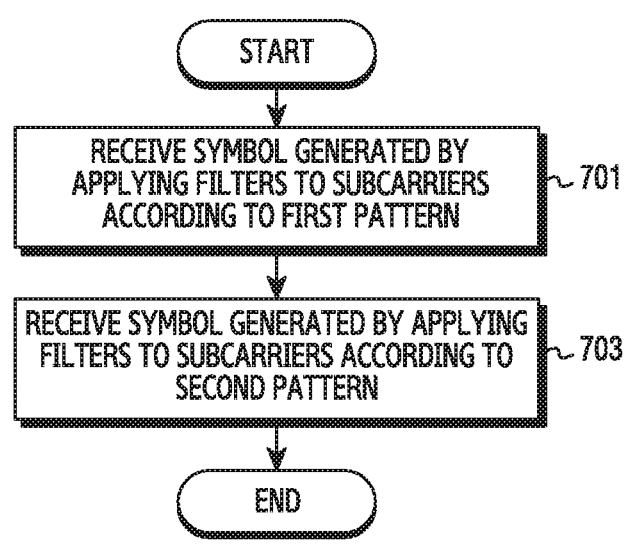
FIG. 7 depicts an operating process of a receiving node in a wireless communication system according to an embodiment of the present invention.

FIG. 7 depicts operations of a receiving node in a wireless communication system according to an embodiment of the present invention. FIG. 7 illustrates an operating method of the receiving node 120.

Referring to FIG. 7, the receiving node 120 receives a symbol generated by applying filters to subcarriers according to a first pattern in operation 701. In other words, the receiving node 120 receives the symbol generated using the filters arranged in the first pattern with respect to the subcarriers. Herein, the symbol indicates an FBMC symbol. Accordingly, although not depicted in FIG. 7, the receiving node 120 can detect the symbol using the filters arranged in the first pattern. For example, the receiving node 120 uses a plurality of filters including a first filter and a second filter. In so doing, the receiving node 120 can filter a symbol mapped to a first subcarrier using the first filter and filter a symbol to be mapped to a second subcarrier using the second filter by applying the first filter to the first subcarrier and the second filter to the second subcarrier.

Next, the receiving node 120 receives the symbol generated by applying the filters to the subcarriers in a second pattern in operation 703. In other words, the receiving node 120 receives other symbol generated through the filters arranged in the second pattern with respect to the subcarriers. Accordingly, although not depicted in FIG. 7, the receiving node 120 can detect the symbol using filters arranged in a second pattern. That is, in a next time slot, the receiving node 120 changes the mapping pattern of the filters to the second pattern. Hence, in the symbol transmitted in operation 701 and the symbol transmitted in operation 703, the filter applied to at least one carrier is different. That is, different filters can be applied to all the subcarriers between two symbols, or different filters can be applied to some subcarrier. For example, the receiving node 120 can filter the symbol mapped to the first subcarrier using the second filter and filter the symbol to be mapped to the second subcarrier using the first filter by applying the second filter to the first subcarrier and the first filter to the second subcarrier.

As described above, the transmitting node 110 and the receiving node 120 according to the present invention can perform the filter interleaving which changes the filters according to the time slot in each subcarrier. Now, as specific applications, the present invention provides filter interleaving based on a selective filter set, Hybrid Automatic Repeat Request (HARQ) retransmission based on the filter interleaving, Space-Time Block Code (STBC) based on the filter interleaving, and repetition transmission based on the filter interleaving. Also, the present invention explains feedback signaling for system management according to each embodiment. Specific embodiments described can be realized in a system of FIG. 8.

Figure 8:
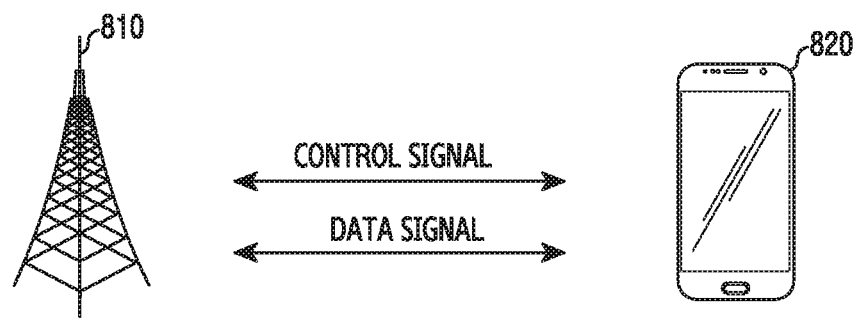
FIG. 8 depicts operations of a base station and a terminal in a wireless communication system according to an embodiment of the present invention.

FIG. 8 depicts a base station and a terminal in a wireless communication system according to an embodiment of the present invention. Referring to FIG. 8, a base station 810 and a terminal 820 conduct communication. Herein, the base station 810 can serve as the transmitting node 110 or the receiving node 120 of FIG. 1, and the terminal 820 can serve as the receiving node 120 or the transmitting node 110 of FIG. 1. At this time, the base station 810 and the terminal 820 can send and receive control signals for delivering control information required for the filter interleaving. Further, the base station 810 and the terminal 820 can send and receive data signals generated by the filter interleaving. Herein, the data signal has a form of an FBMC symbol.

For various embodiments of the present invention, at least one filter set can be defined. The at least one filter set can be designed in consideration of various characteristics for various channel environments. For example, various characteristics of orthogonality, delay spread, and fast fading can be considered. At this time, to obtain diversity gain, a plurality of filter sets having similar characteristics can be used. Each filter set including a plurality of filters has a default filter array.

When the filter sets considering various characteristics are supported, the base station 810 and the terminal 820 need to select an appropriate filter set for a current channel state. For doing so, the base station 810 and the terminal 820 can select a filter set to use based on transmultiplexer response between the filter sets and the current channel, that is, channel quality (e.g., Signal to Interference Ratio (SIR)) calculable over an effective channel. In so doing, control signaling for sharing the selected filter set between the base station 810 and the terminal 820 is required. Hereafter, in the present invention, control information notifying the selected filter set is referred to as a Filter Set indicator (FSI).

The adequate filter set for the current channel can be selected, when channel information can be shared, by any entity of the transmitting node and the receiving node. However, since the transmitting node selects the filter set based on quantized information, it can be more advantageous for the receiving node to select the filter set and feed a selection result back in terms of the performance. Hence, in case of Downlink (DL) and Uplink (UL) both, it is preferred that an entity (e.g., the base station 810, the terminal 820) serving as the receiving node select the filter set based on channel estimation information and then transmit the FSI to the transmitting node (e.g., the base station 810, the terminal 820). Also, unlike feedback of general Channel State Information (CSI), since the filter set should be known to both of the transmitting node and the receiving node, feedback processes of the UL and the DL are similar. A process for exchanging the information of the selected filter set as described above is shown in FIG. 9 and FIG. 10.

Figure 9:
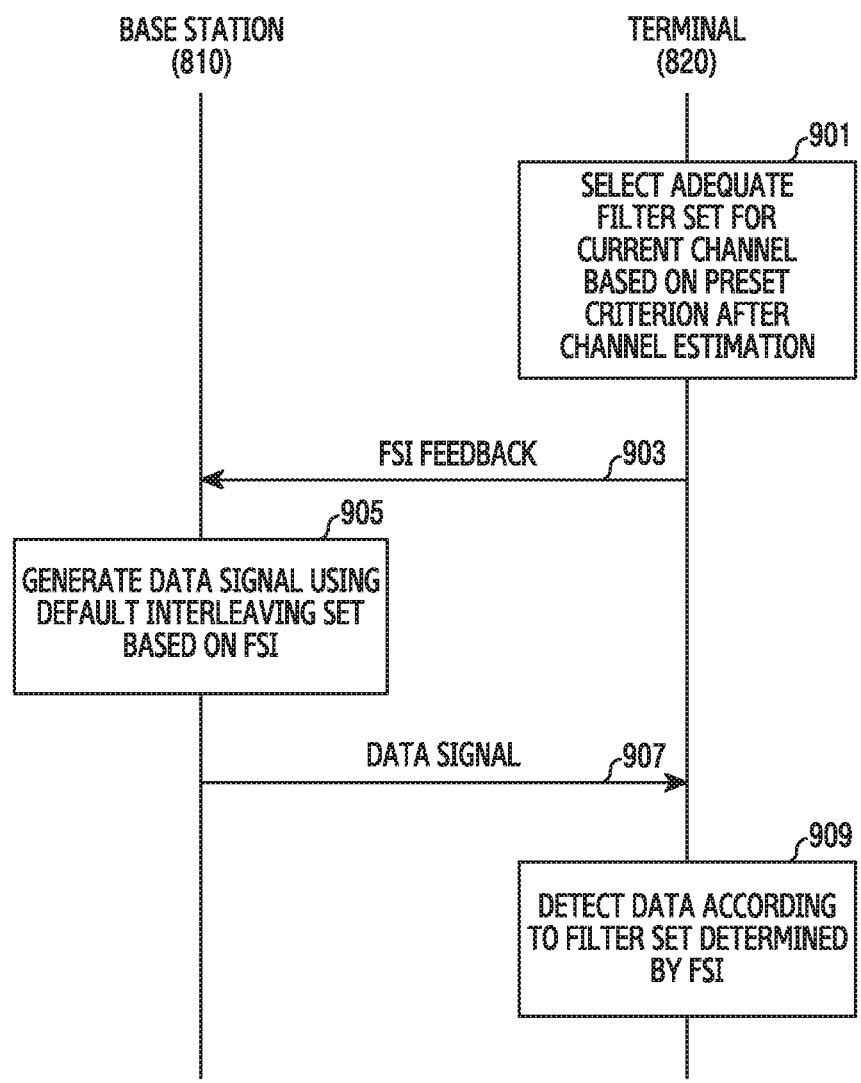
FIG. 9 depicts a process for downlink communication according to filter interleaving based on a selective filter set in a wireless communication system according to an embodiment of the present invention.

FIG. 9 depicts a process for DL communication according to filter interleaving based on a selective filter set in a wireless communication system according to an embodiment of the present invention. FIG. 9 illustrates an operating method of the base station 810 and the terminal 820.

Referring to FIG. 9, in operation 901, the terminal 820 determines an adequate filter set for a current channel based on a preset criterion after channel estimation. That is, the terminal 820 determines the filter set based on channel information. Namely, the terminal 820 and the base station 810 share a plurality of predefined filter sets, and the terminal 820 determines at least one filter set to use for communication. For the channel estimation, the terminal 820 can use a sync signal, a preamble, a Reference Signal (RS), a pilot, and so on.

In operation 903, the terminal 820 sends an FSI to the base station 810. That is, the terminal 820 transmits information indicating the selected filter set. The FSI can include an index assigned to the selected filter set. Hence, the base station 810 can also identify the filter set selected by the terminal 820.

In operation 905, the base station 810 generates a data signal using a default interleaving set according to the received FSI. Herein, the default interleaving set indicates a default filter array of a corresponding filter set. That is, the base station 810 uses the filter set identified by the FSI, and an initial array of the filter set. For example, the base station 810 can generate the data signal by filtering data symbols per subcarrier using the filter set and performing the IFFT operation and the overlap and sum operation.

In operation 907, the base station 810 sends the data signal to the terminal 820. The data signal includes at least one FBMC symbol. When a plurality of FBMC symbols is transmitted, the FBMC symbols each are transmitted on the time axis overlappingly with an adjacent FBMC symbol.

In operation 909, the terminal 820 detects data according to the filter set determined by the FSI. That is, the terminal 820 can restore data symbols by extracting samples of the data signal on the FBMC symbol basis and using the FFT operation and the filtering. In so doing, the terminal 820 performs the filtering using matched filters for filters of the filter set identified by the FSI, that is, selected in operation 901. For example, coefficients of the filters of the filter set and coefficients of the matched filters can be conjugated.

Figure 10:
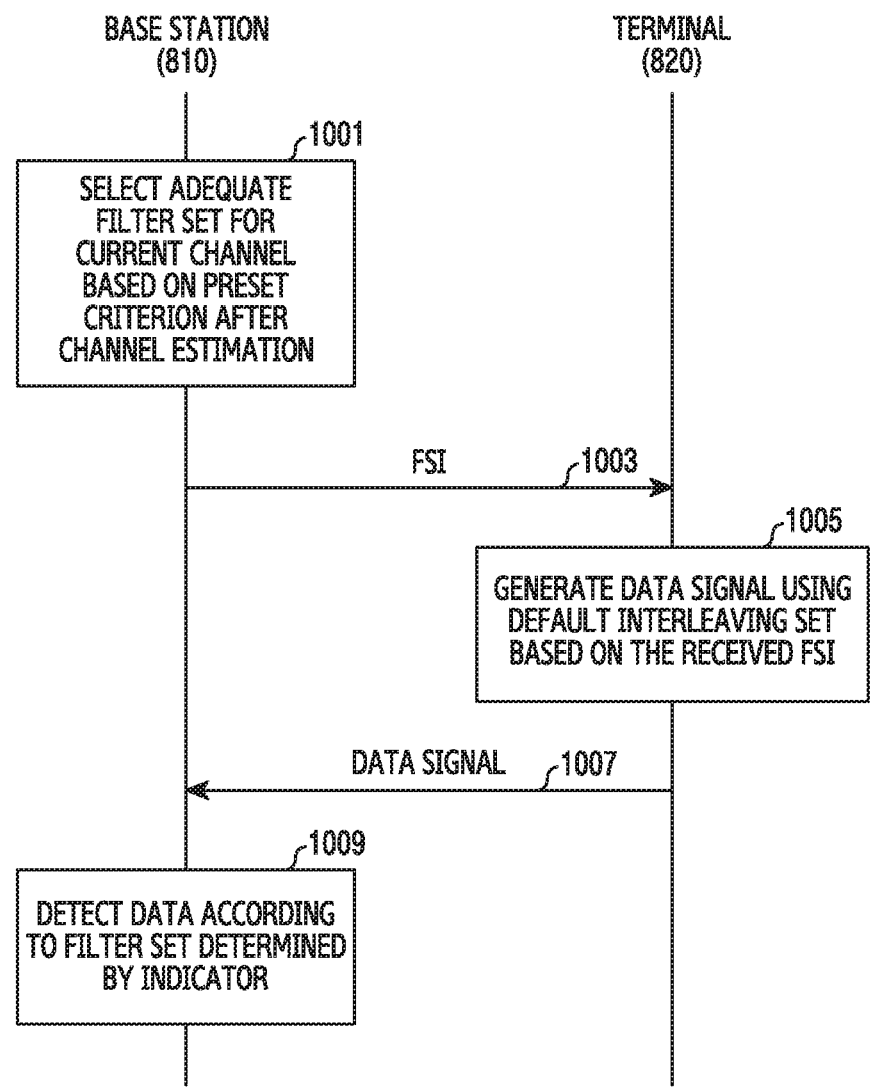
FIG. 10 depicts a process for uplink communication according to filter interleaving based on a selective filter set in a wireless communication system according to an embodiment of the present invention.

FIG. 10 depicts a process for UL communication according to filter interleaving based on a selective filter set in a wireless communication system according to an embodiment of the present invention. FIG. 10 illustrates an operating method of the base station 810 and the terminal 820.

Referring to FIG. 10, in operation 1001, the base station 810 determines an adequate filter set for a current channel based on a preset criterion after channel estimation. That is, the base station 810 determines the filter set based on channel information. Namely, the base station 810 and the terminal 820 share a plurality of predefined filter sets, and the base station 810 determines at least one filter set to use for communication. For the channel estimation, the base station 810 can use a sounding signal, an RS, a pilot, and so on.

In operation 1003, the base station 810 sends an FSI to the terminal 820. That is, the base station 810 transmits information indicating the selected filter set. The FSI can include an index assigned to the selected filter set. Hence, the terminal 820 can also identify the filter set selected by the base station 810.

In operation 1005, the terminal 820 generates a data signal using a default interleaving set according to the received FSI. Herein, the default interleaving set indicates a default filter array of a corresponding filter set. That is, the terminal 820 uses a filter set identified by the FSI, and an initial array of the filter set. For example, the terminal 820 can generate the data signal by filtering data symbols per subcarrier using the filter set and performing the IFFT operation and the overlap and sum operation. In so doing, according to the number of subcarriers allocated to the terminal 820, the terminal 820 can filter some subcarriers.

In operation 1007, the terminal 820 sends the data signal to the base station 810. The data signal includes at least one FBMC symbol. When a plurality of FBMC symbols is transmitted, the FBMC symbols each are transmitted on the time axis overlappingly with an adjacent FBMC symbol.

In operation 1009, the base station 810 detects data according to the filter set determined by the FSI. That is, the base station 810 can restore data symbols by extracting samples of the data signal on the FBMC symbol basis and using the FFT operation and the filtering. In so doing, the base station 810 performs the filtering using matched filters for filters of the filter set identified by the FSI, that is, selected in operation 1001. For example, coefficients of the filters of the filter set and coefficients of the matched filters can be conjugated.

Since the multiple filters are used according to various embodiments of the present invention, one filter set can be expanded to the interleaved filter sets of various arrays. Accordingly, when the same signal is repeatedly transmitted for several times, the system can attain gain through the filter interleaving which retransmits based on the interleaved filter set expanded from one filter set, rather than a fixed pattern. However, when one terminal conducts the filter interleaving, other terminal which uses an adjacent subcarrier can suffer from interference. For example, the interference can arise in a case of FIG. 11.

Figure 11A:
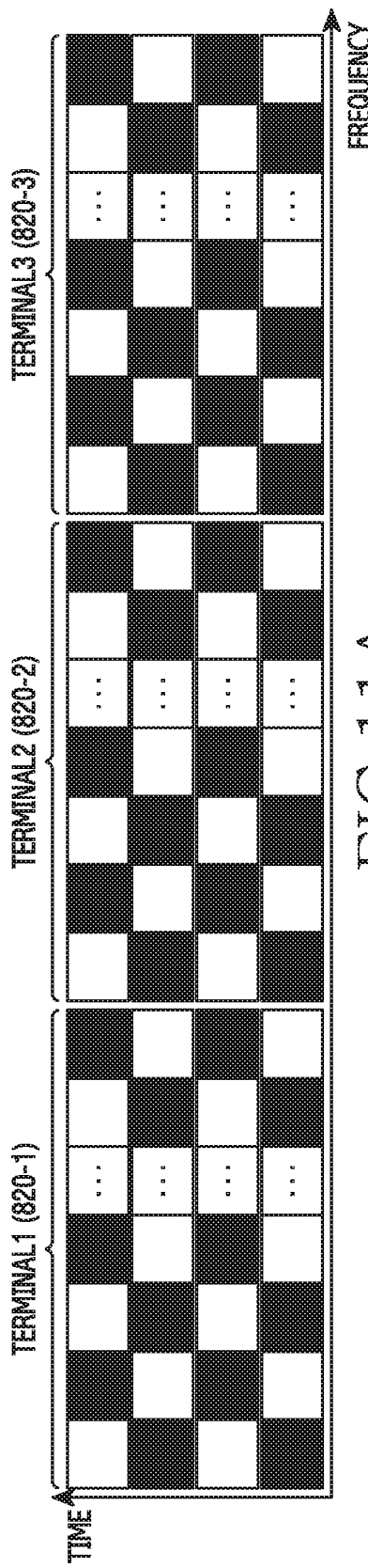
FIGS. 11A and 11B depict interference between terminals due to filter interleaving in a wireless communication system according to an embodiment of the present invention.
Figure 11B:
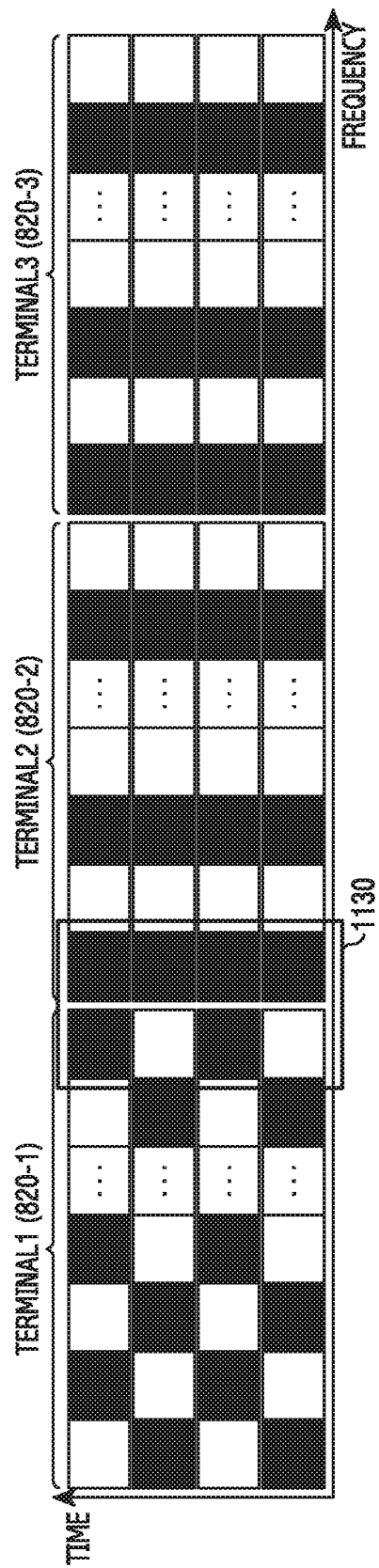

FIGS. 11A and 11B depict interference between terminals due to filter interleaving in a wireless communication system according to an embodiment of the present invention. FIG. 11 illustrates subcarrier allocation and filter patterns of a first terminal 820-1, a second terminal 820-2, and a third terminal 820-3. FIG. 11A shows a case without the interference between the first terminal 820-1, the second terminal 820-2, and the third terminal 820-3, and FIG. 11B shows a case with the interference between the first terminal 820-1, the second terminal 820-2, and the third terminal 820-3. Referring to FIG. 11A, all of the first terminal 820-1, the second terminal 820-2, and the third terminal 820-3 perform the filter interleaving. Hence, since different filters are used in all of time slots between terminals using adjacent subcarriers, specifically, between the rightmost subcarrier allocated to the first terminal 820-1 and the left-most subcarrier allocated to the second terminal 820-2, no interference occurs. By contrast, in FIG. 11B, only the first terminal 820-1 performs the filter interleaving. Accordingly, in two subcarriers 1130 including the right-most subcarrier allocated to the first terminal 820-1 and the left-most subcarrier allocated to the second terminal 820-2, the same filter is used between the right-most subcarrier allocated to the first terminal 820-1 and the left-most subcarrier allocated to the second terminal 820-2 in some time slots, specifically, in time slots #2 and #4 and thus the interference can occur.

The filter interleaving can cause the interference between the terminals as shown in FIG. 11B. Hence, for the terminals which use adjacent subcarriers, a process for notifying the filter interleaving is required. The filter interleaving can be notified by indicating setting of a guard carrier. Hereafter, in the present invention, control information notifying the setting of the guard carrier is referred to a Guard Carrier Indicator (GCI).

A terminal receiving the GCI set to a positive value (e.g., 1) sets the GC and allocates or detects a resource. Since the GCI needs to be transmitted to all of terminals, the base station 810 can broadcast in the DL and the UL. In so doing, a filter interleaving pattern can be fed back by an indicator defined in an embodiment of each filter interleaving. As stated above, a process for exchanging the GC information is shown in FIG. 12 and FIG. 13.

Figure 12:
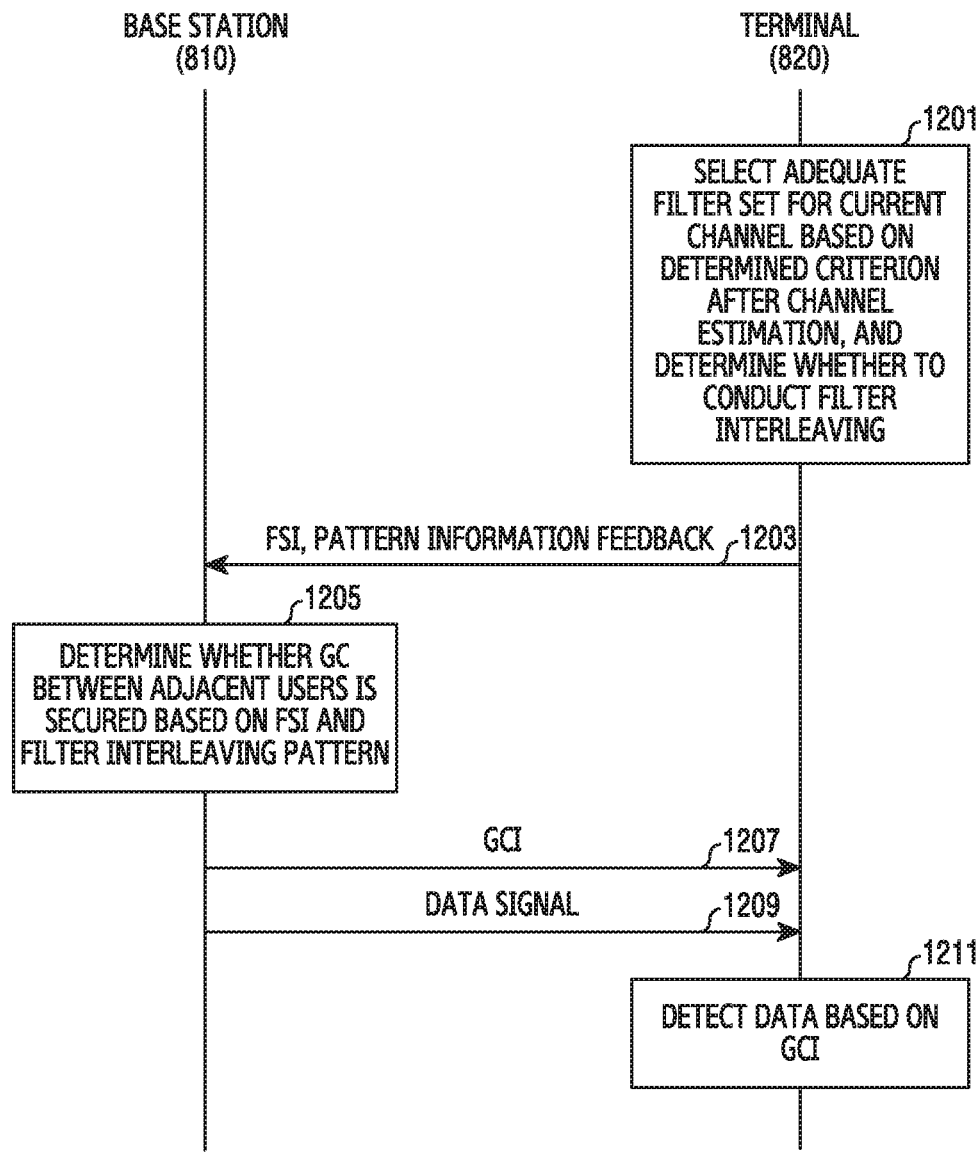
FIG. 12 depicts a process for downlink communication according to filter interleaving based on a guard carrier in a wireless communication system according to an embodiment of the present invention.
Figure 13:
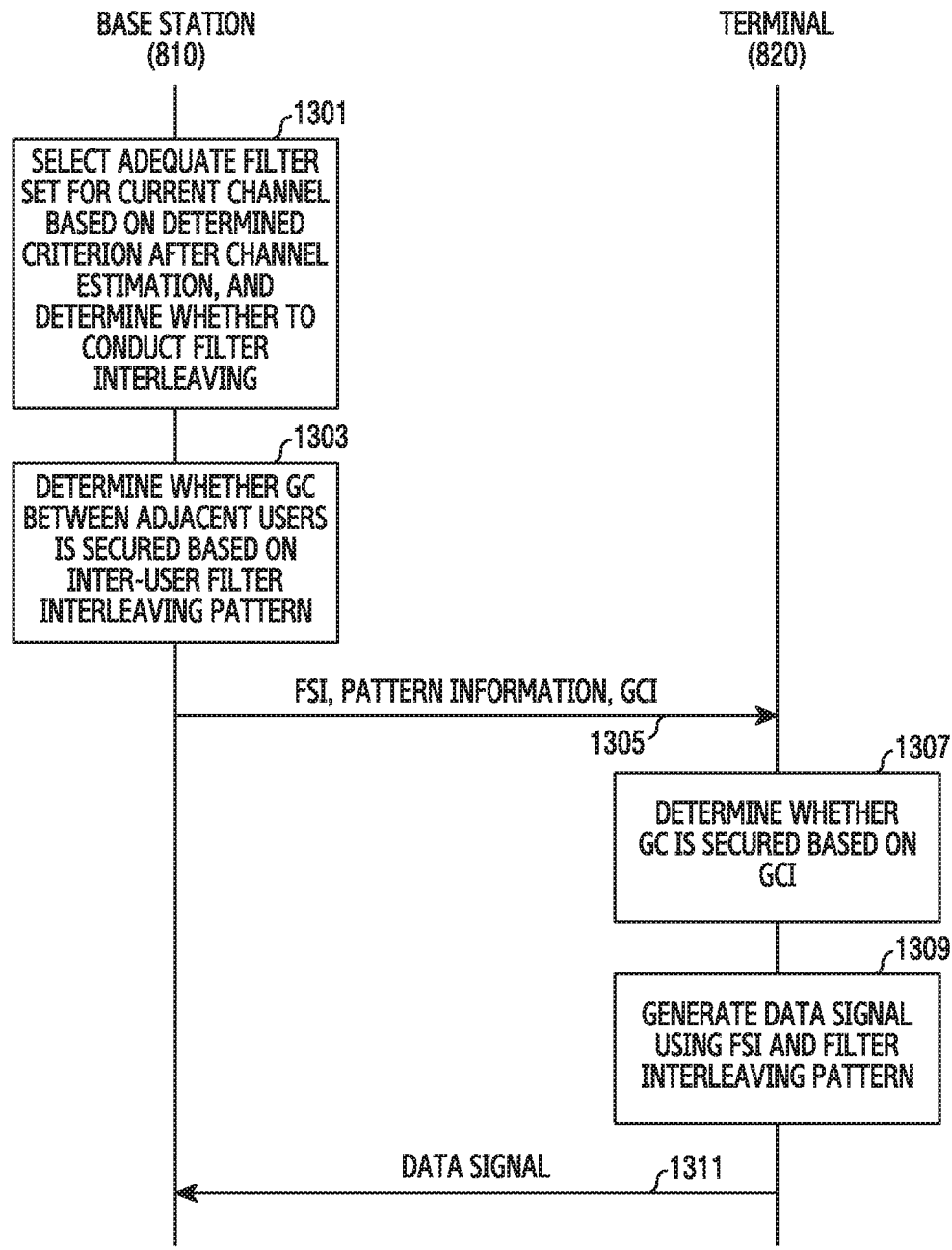
FIG. 13 depicts a process for uplink communication according to filter interleaving based on a guard carrier in a wireless communication system according to an embodiment of the present invention.

FIG. 12 depicts a process for DL communication according to filter interleaving considering a GC in a wireless communication system according to an embodiment of the present invention. FIG. 12 illustrates an operating method of the base station 810 and the terminal 820.

Referring to FIG. 12, in operation 1201, the terminal 820 determines an adequate filter set for a current channel based on a determined criterion after channel estimation, and determines whether to conduct the filter interleaving. In other words, the terminal 820 determines the filter set based on channel information. Namely, the terminal 820 and the base station 810 share a plurality of predefined filter sets, and the terminal 820 determines at least one filter set to use for communication. The terminal 820 determines whether the filter interleaving is performed. For example, the terminal 820 can determine whether the filter interleaving is performed based on broadband channel information, channel information per subcarrier, whether STBC is conducted, and whether HARQ retransmission is conducted.

In operation 1203, the terminal 820 sends a FSI and filter interleaving pattern information to the base station 810. That is, the terminal 820 transmits information indicating the selected filter set and information indicating an array of filters for the filter interleaving. The FSI can include an index allocated to the selected filter set. The information indicating the array of filters can include an index allocated to a corresponding array, or indicate an order of the filters using indexes of the filters. Accordingly, the base station 810 can also identify the filter set selected by the terminal 820, whether the filter interleaving is conducted, and the pattern of the filters for the interleaving.

In operation 1205, the base station 810 determines whether a GC between adjacent users is secured based on the received FSI and filter interleaving pattern. In other words, the base station 810 determines whether the GC is set between terminals which use adjacent subcarriers. For example, when one of the terminals using the adjacent subcarriers performs the filter interleaving and another terminal does not perform the filter interleaving, the base station 810 determines that the GC setting is required for one of the two terminals. In FIG. 12, the base station 810 determines that the GC setting is required for the terminal 820.

In operation 1207, the base station 810 sends a GCI to the terminal 820. That is, the base station 810 transmits to the terminal 820 information notifying whether the GC is set. Herein, the GCI is set to a positive value (e.g., 1) or a negative value (e.g., 0). Accordingly, the terminal 820 can determine whether the GC is set in an allocated resource.

In operation 1209, the base station 810 generates a data signal using a default interleaving set and the interleaved filter set according to time received FSI. The default interleaving set indicates a default filter array of a corresponding filter set, and the interleaved filter set indicates a pattern of different filters from the default filter array identified by the interleaving pattern information. Herein, the data signal can include a plurality of FBMC symbols, and a plurality of symbols can be generated through the filters of different patterns. For example, the based station 810 can generate the data signal by filtering data symbols per subcarrier using the filter set and performing the IFFT operation and the overlap and sum operation.

In operation 1211, the terminal 820 detects data based on the GCI. That is, when the necessary of the GC is indicated, the terminal 820 sets the GC, and extracts and detects a signal from other resource region than the GC. In so doing, the terminal 820 detects the data according to the filter sets determined by the FSI and the interleaving pattern information. For example, the terminal 820 can restore data symbols by extracting samples of the data signal on the FBMC symbol basis and conducting the FFT operation and the filtering.

FIG. 13 depicts a process for UL communication according to filter interleaving considering a GC in a wireless communication system according to an embodiment of the present invention. FIG. 13 illustrates an operating method of the base station 810 and the terminal 820.

Referring to FIG. 13, in operation 1301, the base station 810 determines an adequate filter set for a current channel based on a determined criterion after channel estimation, and determines whether to conduct the filter interleaving. In other words, the base station 810 determines the filter set based on channel information. Namely, the base station 810 and the terminal 820 share a plurality of predefined filter sets, and the base station 810 and determines at least one filter set to use for communication. The base station 810 determines whether to conduct the filter interleaving. In so doing, whether to conduct the filter interleaving can be determined differently per terminal. That is, the filter interleaving can be performed for the terminal 820, and the filter interleaving may not be performed for other terminal. For example, the base station 810 can determine whether to perform the filter interleaving based on broadband channel information, channel information per subcarrier, whether STBC is conducted, and whether HARQ retransmission is conducted.

In operation 1303, the base station 810 determines whether a GC between adjacent users is secured based on the received FSI and filter interleaving pattern. In other words, the base station 810 determines whether the GC is set between terminals which use adjacent subcarriers. For example, when one of the terminals using the adjacent subcarriers performs the filter interleaving and another terminal does not perform the filter interleaving, the base station 810 determines that the GC setting is required for one of the two terminals. In FIG. 13, the base station 810 determines that the GC setting is required for the terminal 820.

In operation 1305, the base station 810 sends an FSI, filter interleaving pattern information, and a GCI to the terminal 820. That is, the base station 810 transmits information indicating the filter set determined in operation 1301 and information notifying the array of the filters for the filter interleaving, and transmits information notifying whether the GC is set. The FSI can include an index allocated to the selected filter set. The information indicating the array of the filters can include an index allocated to a corresponding array, or indicate an order of the filters using indexes of the filters. Accordingly, the terminal 820 can also identify the filter set selected by the base station 810, whether the filter interleaving is conducted, the pattern of the filters for the interleaving, and whether the GC is set.

In operation 1307, the terminal 820 determines whether the GC is secured based on the GCI. That is, the terminal 820 determines whether to set the GC based on control information received from the base station 810. When the GCI is set to a positive value, the terminal 820 sets at least one subcarrier adjacent to a resource allocated to other terminal in an allocated resource region, as the GC.

In operation 1309, the terminal 820 generates a data signal using a default interleaving set and the interleaved filter set according to the FSI. The default interleaving set indicates a default filter array of a corresponding filter set, and the interleaved filter set indicates a pattern of different filters from the default filter array identified by the interleaving pattern information. Herein, the data signal can include a plurality of FBMC symbols, and a plurality of symbols can be generated through filters of different patterns. For example, the terminal 820 can generate the data signal by filtering data symbols per subcarrier using the filter set and performing the IFFT operation and the overlap and sum operation.

In operation 1311, the terminal 820 sends the data signal to the base station 810. The data signal includes at least one FBMC symbol. When a plurality of FBMC symbols is transmitted, the FBMC symbols each are transmitted on the time axis overlappingly with an adjacent FBMC symbol. Accordingly, the base station 810 detects data. That is, when the necessity of the GC is indicated in operation 1305, the base station 810 extracts and detects a signal from other resource region than the GC. In so doing, the base station 810 detects the data according to the filter sets determined by the FSI and the interleaving pattern information. For example, the base station 810 can restore data symbols by extracting samples of the data signal on the FBMC symbol basis and conducting the FFT operation and the filtering.

Figure 14:
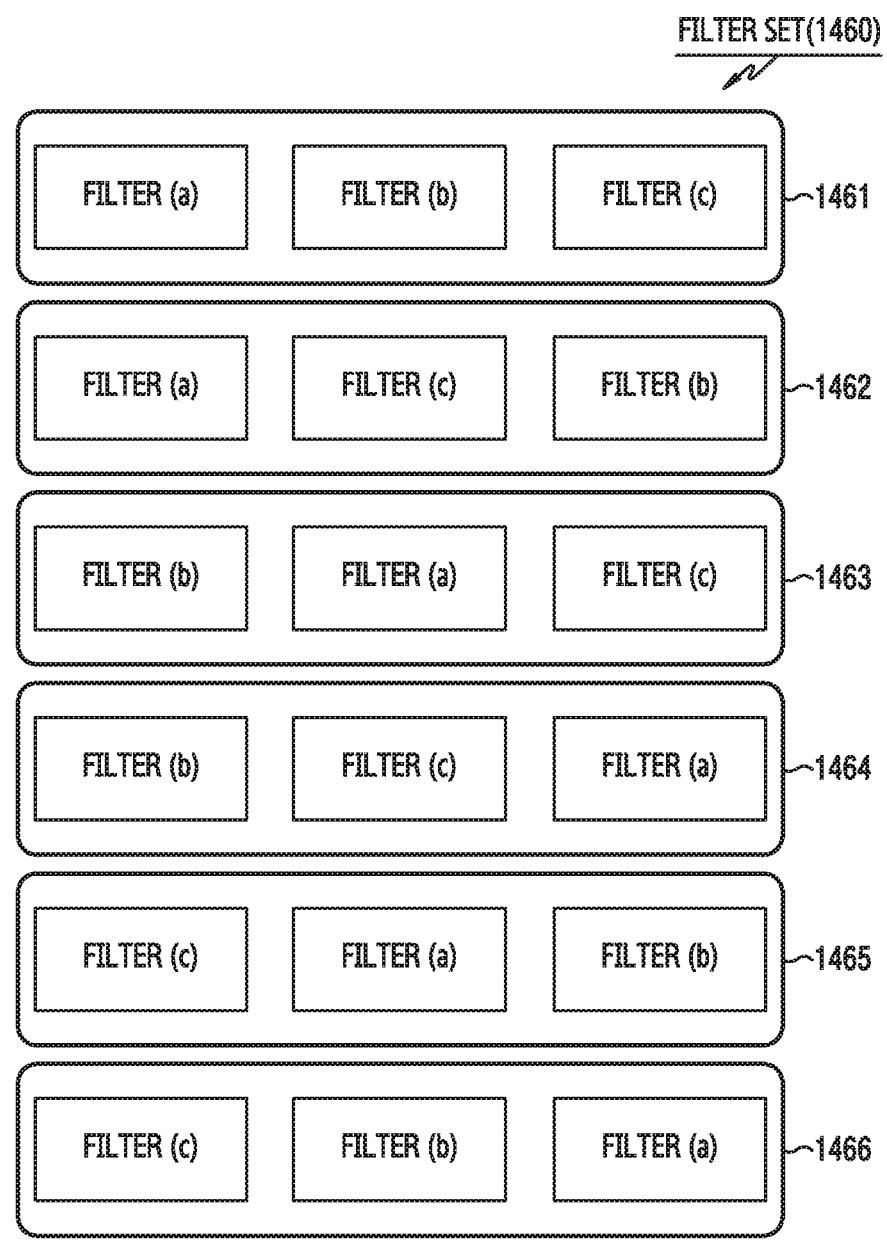
FIG. 14 depicts an example of interleaved filter sets in a wireless communication system according to an embodiment of the present invention.

As stated above, one filter set can be expanded to the interleaved filter sets by changing the array of the filters. For example, one filter set can be expanded to a plurality of interleaved filter sets as shown in FIG. 14. FIG. 14 depicts an example of interleaved filter sets in a wireless communication system according to an embodiment of the present invention. Referring to FIG. 14, a filter set 1460 includes three filters of a filter (a), a filter (b), and a filter (c). Since the filter (a), the filter (b), and the filter (c) can be arranged in six orders, the filter set 1460 can be expanded to six interleaved filter sets 1461 through 1466.

Thus, it is possible define to indicate the interleaved filter sets by adding additionally bits to the FSI, and the base station 810 and the terminal 820 can share the interleaved filter set through feedback signaling. However, since the expanded interleaved filter sets merely provide diversity with one filter set by default and do not have new characteristics, their performance gain is not considerable. Accordingly, to reduce overhead for the interleaved filter sets, a Filter Interleaving Indicator (FII) and a Group Filter Interleaving Indicator (GFII) which are new feedback signals can be used in addition to the FSI.

According to a HARQ process, the transmitting node performs retransmission based on Cyclic Redundancy check (CRC). Since the HARQ process retransmits the same signal, the filter interleaving can be applied between initial transmission and retransmission. That is, when the retransmission is generated by the HARQ process, the system can obtain additional gain by using the interleaved filter set which is filter interleaved, rather than using the same filter set as the initial transmission. For doing so, the FII can be used. The FII indicates any one of the interleaved filter sets expanded from the same filter set.

When a plurality of interleaved filter sets is derived from one filter set, a criterion for selecting one interleaved filter set is required. For example, to use a more appropriate interleaved filter set for a current channel, a criterion which uses a filter of better frequency confinement characteristic for subcarriers of strong channel gain and uses a filter of better orthogonality characteristic for subcarriers of small channel gain can be applied. In so doing, to obtain diversity effect from the retransmission, the interleaved filter set already used is excluded. As described above, according to the HARQ process including the filter interleaving, the transmitting node can select the filter set based on the FSI in the initial transmission, and the receiving node can select the interleaved filter set in the retransmission and then feed the FII back. As such, the retransmission process is shown in FIG. 15 and FIG. 16.

Figure 15:
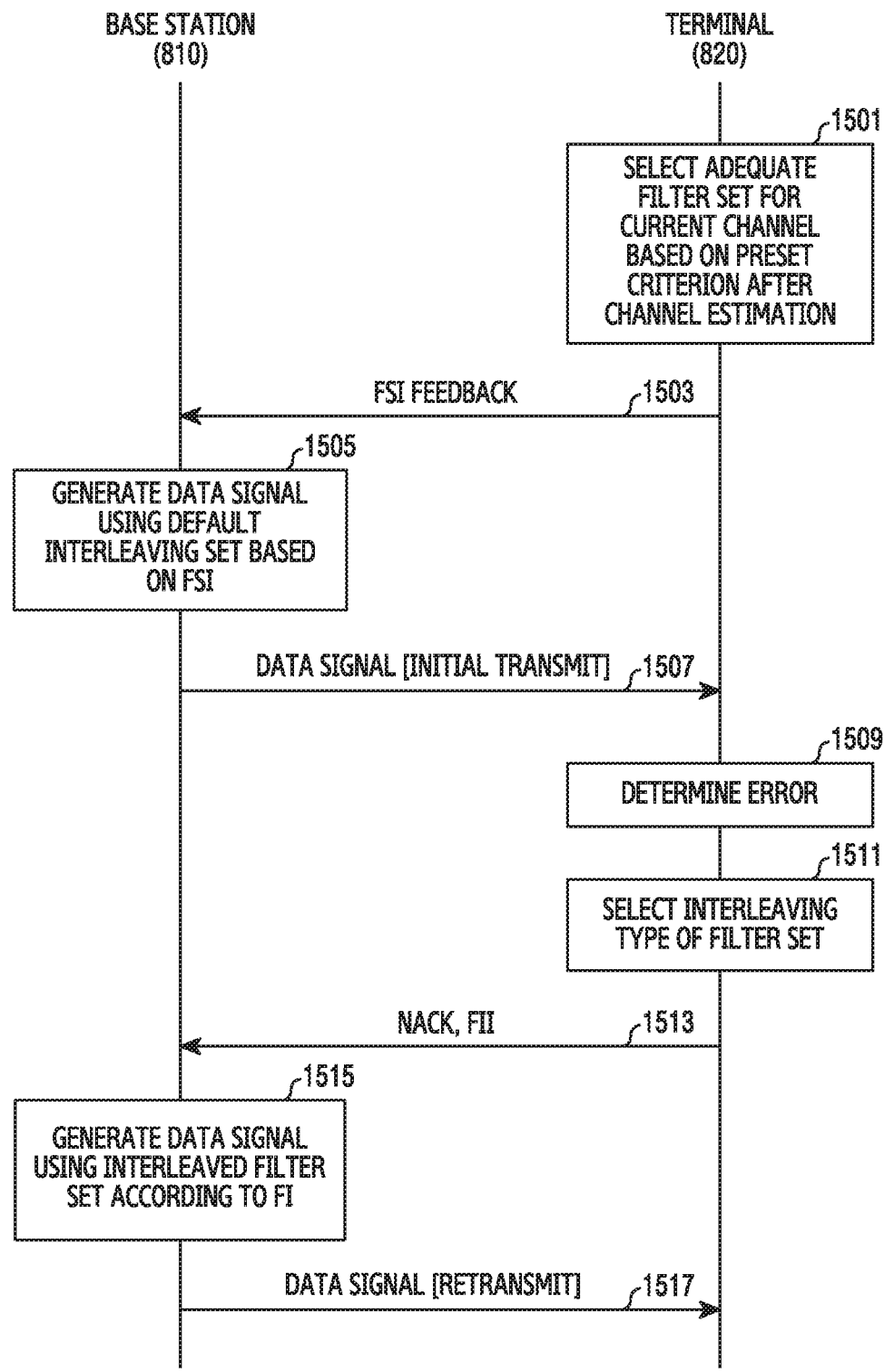
FIG. 15 depicts a downlink communication process according to filter interleaving based retransmission in a wireless communication system according to an embodiment of the present invention.
Figure 16:
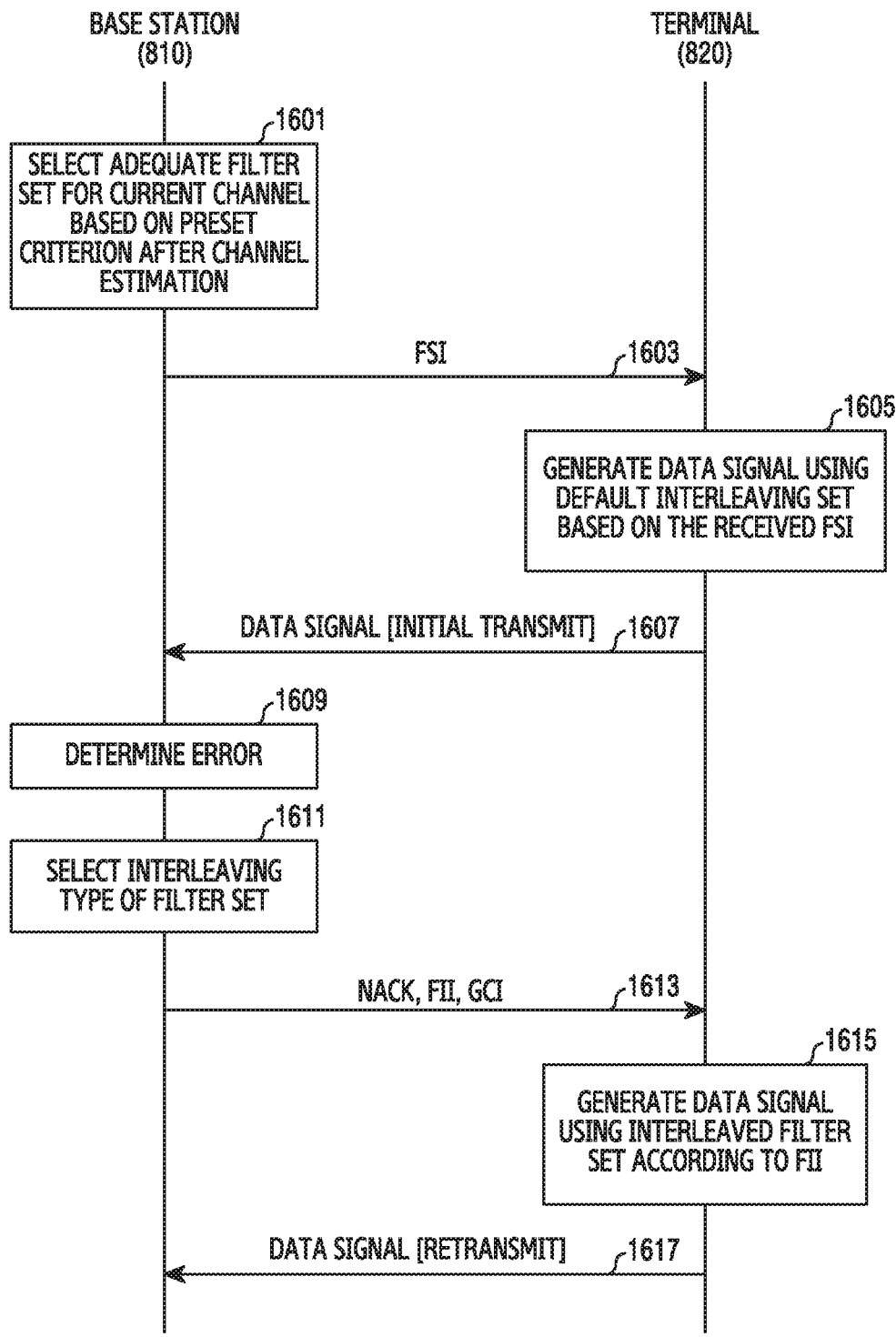
FIG. 16 depicts an uplink communication process according to filter interleaving based retransmission in a wireless communication system according to an embodiment of the present invention.

FIG. 15 depicts a DL communication process according to filter interleaving based retransmission in a wireless communication system according to an embodiment of the present invention. FIG. 15 illustrates an operating method of the base station 810 and the terminal 820.

Referring to FIG. 15, in operation 1501, the terminal 820 determines an adequate filter set for a current channel based on a preset criterion after channel estimation. That is, the terminal 820 determines the filter set based on channel information. Namely, the terminal 820 and the base station 810 share a plurality of predefined filter sets, and the terminal 820 determines at least one filter set to use for communication. For the channel estimation, the terminal 820 can use a sync signal, a preamble, an RS, a pilot, and so on. For example, the terminal 820 can select a second filter set 1770 including a filter (a), a filter (b), and a filter (c) from a first filter set 1760, the second filter set 1770, and a third filter set 1780 of FIG. 17A.

In operation 1503, the terminal 820 sends an FSI to the base station 810. That is, the terminal 820 transmits information indicating the selected filter set (e.g., the second filter set 1770). The FSI can include an index assigned to the selected filter set. Hence, the base station 810 can also identify the filter set selected by the terminal 820.

In operation 1505, the base station 810 generates a data signal using a default interleaving set according to the received FSI. Herein, the default interleaving set indicates a default filter array of a corresponding filter set. For example, referring to FIGS. 17A and 17B, the default interleaving set of the first filter set 1760 is a pattern 1761 defined as {filter (1), filter (2)}, the default interleaving set of the second filter set 1770 is a pattern 1771 defined as {filter (a), filter (b), filter (c)}, and the default interleaving set of the third filter set 1780 is a pattern 1781 defined as {filter (A), filter (B), filter (C), filter (D)}. That is, the base station 810 uses the filter set identified by the FSI, and an initial array (e.g., the pattern 1771) of the filter set. For example, the base station 810 can generate the data signal by filtering data symbols per subcarrier using the filter set and performing the IFFT operation and the overlap and sum operation.

In operation 1507, the base station 810 sends the data signal to the terminal 820. The data signal includes an initial transmit packet. Also, the data signal includes at least one FBMC symbol. When a plurality of FBMC symbols is transmitted, the FBMC symbols each are overlappingly transmitted with an adjacent FBMC symbol on the time axis.

In operation 1509, the terminal 820 determines an error in the data signal detection. That is, the terminal 820 attempts to detect the data signal and then determines detection failure through CRC. For example, the terminal 820 extracts samples of the data signal on the FBMC symbol basis, and attempts to restore the data symbols through the FFT operation and the filtering. In so doing, the terminal 820 performs the filtering using matched filters for the filters of the filter set identified by the FSI, that is, selected in operation 1501. However, after decoding the data symbols and performing the CRC, the terminal 820 determines error occurrence.

In operation 1511, the terminal 820 selects the interleaving scheme of the filter set. That is, the terminal 820 determines the pattern of the interleaved filter set, that is, the filters for the retransmission. In so doing, the pattern for the retransmission is different from an initial array used in operation 1505. For example, when the second filter set 1770 of FIG. 17A in selected in operation 1501, patterns 1772 through 1776 which are the interleaved second filter set can be defined by changing the order of the filters in the pattern 1771 which is the initial array. As a result, the terminal 820 can select one (e.g., the pattern 1773) of the patterns 1772 through 1776 for the retransmission.

In operation 1513, the terminal 820 sends Non-Acknowledge (NACK) and the FII. That is, the terminal 820 transmits control information notifying the detection failure of the data signal and control information notifying the pattern of the filters to be used for the retransmission. Hence, the base station 810 can identify the data signal detection failure and the interleaved filter set (e.g., the pattern 1773) for the retransmission.

In operation 1515, the base station 810 generates a data signal using the interleaved filter set according to the FII. The interleaved filter set indicates filters differently arranged from the default filter array of the corresponding filter set. For example, the default filter array can be the pattern 1771, and the interleaved filter set can be the pattern 1773. That is, the base station 810 uses the filter set identified by the FSI and the initial array of the filter set. For example, the base station 810 can generate the data signal by filtering data symbols per subcarrier using the filter set and performing the IFFT operation and the overlap and sum operation.

In operation 1517, the base station 810 sends the data signal to the terminal 820. In so doing, the data signal includes a retransmit packet. The retransmit packet is a packet for the retransmission according to the HARQ scheme, and can include the same data as the initial transmit packet or redundancy information of a different version. Also, the data signal includes at least one FBMC symbol. When a plurality of FBMC symbols is transmitted, the FBMC symbols each are overlappingly transmitted with an adjacent FBMC symbol on the time axis.

FIG. 16 depicts a UL communication process according to filter interleaving based retransmission in a wireless communication system according to an embodiment of the present invention. FIG. 16 illustrates an operating method of the base station 810 and the terminal 820.

Referring to FIG. 16, in operation 1601, the base station 810 determines an adequate filter set for a current channel based on a preset criterion after channel estimation. That is, the base station 810 determines the filter set based on channel information. Namely, the base station 810 and the terminal 820 share a plurality of predefined filter sets, and the base station 810 determines at least one filter set to use for communication. For the estimation, the base station 810 can use a sounding signal, an RS, a pilot, and so on. For example, the base station 810 can select the second filter set 1770 including the filter (a), the filter (b), and the filter (c) from the first filter set 1760, the second filter set 1770, and the third filter set 1780 of FIG. 17.

In operation 1603, the base station 810 sends an FSI to the terminal 820. That is, the base station 810 transmits information indicating the selected filter set (e.g., the second filter set 1770). The FSI can include an index assigned to the selected filter set. Hence, the terminal 820 can also identify the filter set selected by the base station 810.

In operation 1605, the terminal 820 generates a data signal using a default interleaving set according to the received FSI. Herein, the default interleaving set indicates a default filter array of a corresponding filter set. For example, referring to FIG. 17, the default interleaving set of the first filter set 1760 is the pattern 1761 defined as {filter (1), filter (2)}, the default interleaving set of the second filter set 1770 is the pattern 1771 defined as {filter (a), filter (b), filter (c)}, and the default interleaving set of the third filter set 1780 is the pattern 1781 defined as {filter (A), filter (B), filter (C), filter (D)}. That is, the terminal 820 uses the filter set identified by the FSI, and an initial array (e.g., the pattern 1771) of the filter set. For example, the terminal 820 can generate the data signal by filtering data symbols per subcarrier using the filter set and performing the IFFT operation and the overlap and sum operation.

In operation 1607, the terminal 820 sends the data signal to the base station 810. The data signal includes an initial transmit packet. Also, the data signal includes at least one FBMC symbol. When a plurality of FBMC symbols is transmitted, the FBMC symbols each are overlappingly transmitted with an adjacent FBMC symbol on the time axis.

In operation 1609, the base station 810 determines an error in the data signal detection. That is, the base station 810 attempts to detect the data signal and then determines detection failure through CRC. For example, the base station 810 extracts samples of the data signal on the FBMC symbol basis, and attempts to restore data symbols through the FFT operation and the filtering. In so doing, the base station 810 performs the filtering using matched filters for the filters of the filter set identified by the FSI, that is, selected in operation 1601. However, by decoding the data symbols and performing the CRC, the base station 810 determines error occurrence.

Figure 17A:
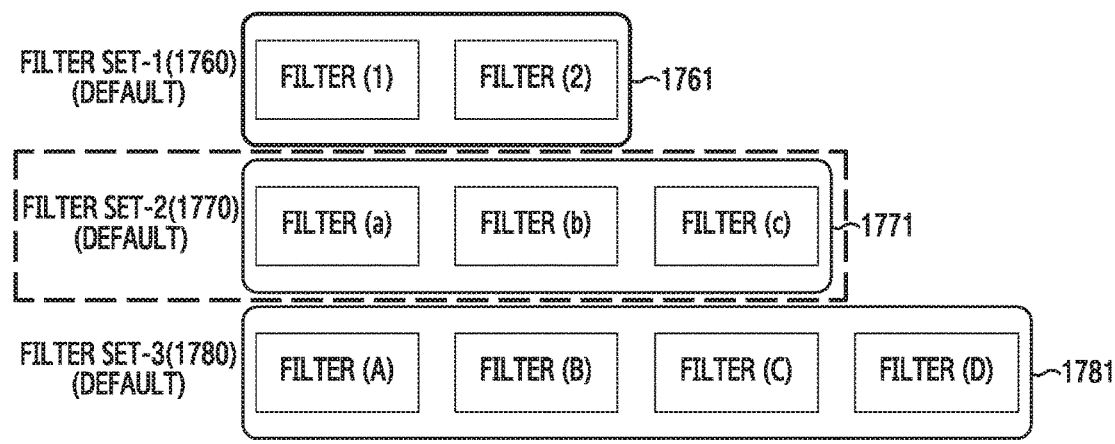
FIGS. 17A and 17B depict an example of a selected filter set for filter interleaving based retransmission in a wireless communication system according to an embodiment of the present invention.
Figure 17B:
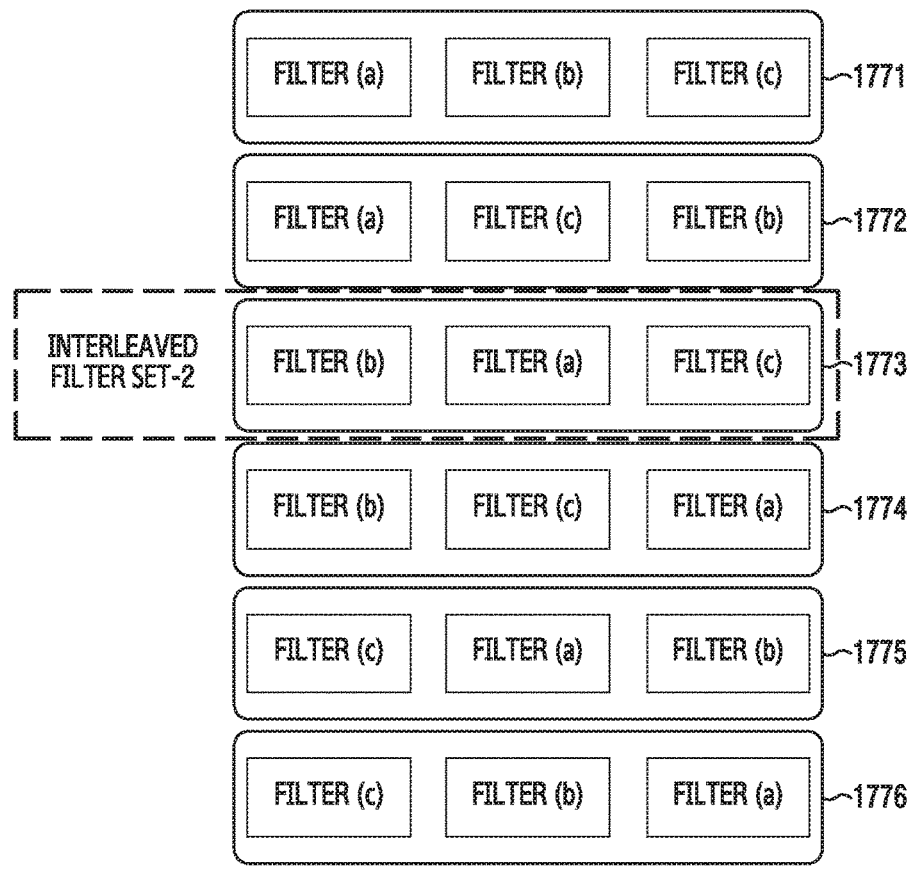

In operation 1611, the base station 810 selects the interleaving scheme of the filter set. That is, the base station 810 determines the pattern of the interleaved filter set, that is, the filters for the retransmission. In so doing, the pattern for the retransmission is different from an initial array used in operation 1605. For example, when the second filter set 1770 of FIG. 17A is selected in operation 1601, patterns 1772 through 1776 which are the interleaved second filter set can be defined by changing the order of the filters in the pattern 1771 which is the initial array. As a result, the base station 810 can select one (e.g., the pattern 1773) of the patterns 1772 through 1776 for the retransmission. Further, the base station 810 can determine whether GC setting is required for the terminal 820, based on whether the terminal 820 and other terminal perform the filter interleaving.

In operation 1613, the base station 810 sends NACK, an FII, and a GCI. That is, the base station 810 transmits control information notifying the detection failure of the data signal, control information notifying the pattern of the filters to be used for the retransmission, and information notifying whether the GC is set. Hence, the terminal 820 can identify the data signal detection failure and the interleaved filter set (e.g., the pattern 1773) for the retransmission.

In operation 1615, the terminal 820 generates a data signal using the interleaved filter set according to the FII. The interleaved filter set indicates filters differently arranged from the default filter array of the corresponding filter set. For example, the default filter array can be the pattern 1771, and the interleaved filter set can be the pattern 1773. That is, the terminal 820 uses the filter set identified by the FSI and the initial array of the filter set. For example, the terminal 820 can generate the data signal by filtering data symbols per subcarrier using the filter set and performing the IFFT operation and the overlap and sum operation.

In operation 1617, the terminal 820 sends the data signal to the base station 810. In so doing, the data signal includes a retransmit packet. The retransmit packet is a packet for the retransmission according to the HARQ scheme, and can include the same data as the initial transmit packet or redundancy information of a different version. Also, the data signal includes at least one FBMC symbol. When a plurality of FBMC symbols is transmitted, the FBMC symbols each are overlappingly transmitted with an adjacent FBMC symbol on the time axis.

Figure 18:
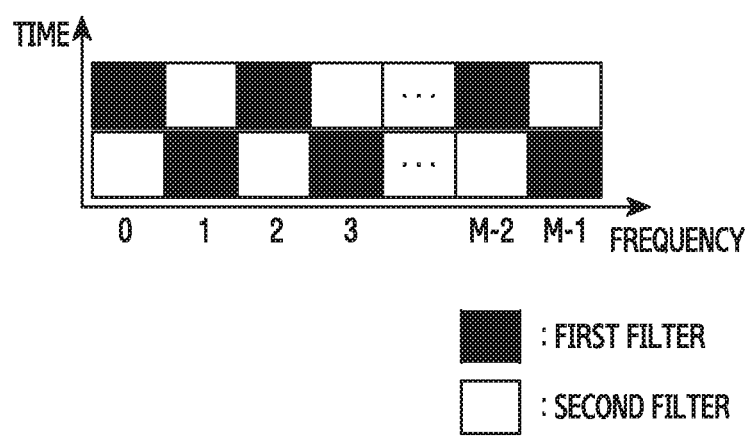
FIG. 18 depicts an example of a Space-Time Block Code (STBC) signal filter-interleaved in a wireless communication system according to an embodiment of the present invention.

The STBC used to obtain the diversity in a Multiple-Input Multiple-Output (MIMO) system also has a characteristic that it repeatedly sends the same signals over a plurality of time slots. Hence, the filter interleaving can be also applied to the STBC as shown in FIG. 18. FIG. 18 depicts an example of a STBC signal filter-interleaved in a wireless communication system according to an embodiment of the present invention. As shown in FIG. 18, in adjacent time slots, filters used for the respective subcarriers are different from each other. Specifically, the subcarrier #0 uses a second filter in the first time slot and uses a first filter in the second time slot. While FIG. 18 illustrates two filters used, a case where three or more filters are used can be applied similarly.

When the STBC is used, a process for notifying the interleaved filter sets to use in the time slots is additionally required. For doing so, additional bits are added to the FSI to thus indicate the interleaved filter sets, and the base station 810 and the terminal 820 can share the interleaved filter set for the STBC through the feedback signaling. However, to reduce overhead, an interleaved filter set group can be predefined according to the time slot used by the STBC, and control information indicating a series of patterns for the predefined filters can be transmitted between the base station 810 and the terminal 820. The control information indicating a series of the patterns is referred to as a group filter interleaving indicator. The process for the STBC as described above is as shown in FIG. 19 and FIG. 20.

Figure 19:
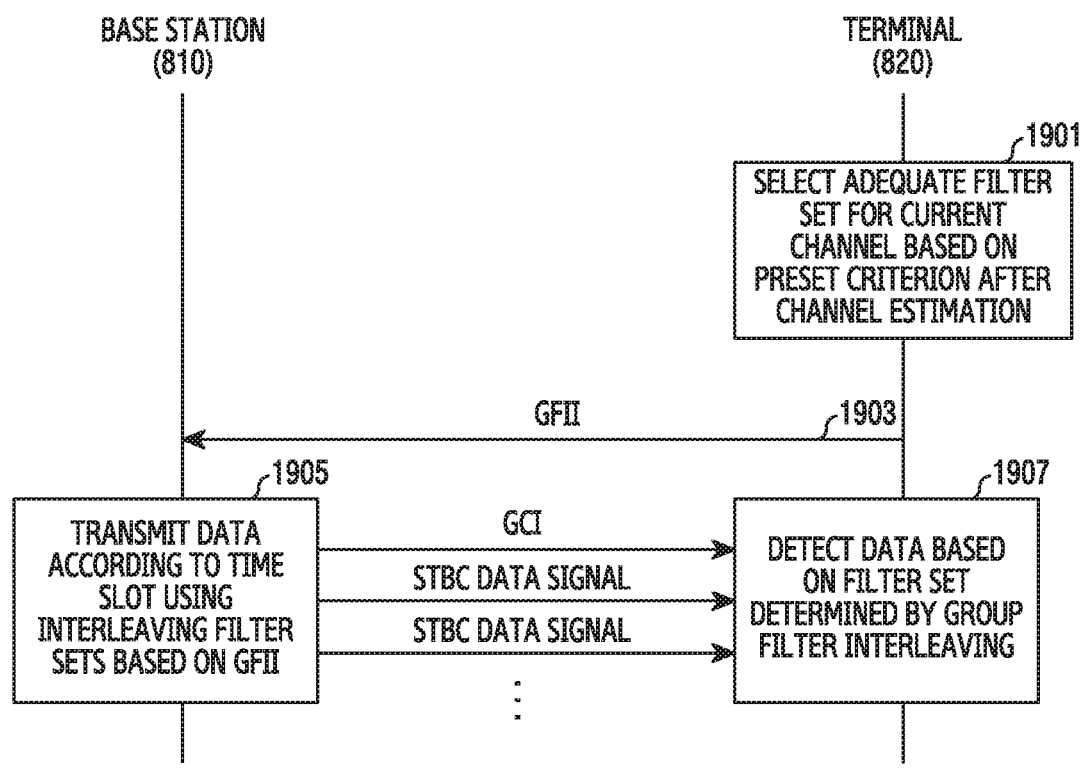
FIG. 19 depicts a downlink communication process according to filter interleaving based STBC in a wireless communication system according to an embodiment of the present invention.

FIG. 19 depicts a DL communication process according to filter interleaving based STBC in a wireless communication system according to an embodiment of the present invention. FIG. 19 illustrates an operating method of the base station 810 and the terminal 820.

Referring to FIG. 19, in operation 1901, the terminal 820 determines an adequate filter set for a current channel based on a preset criterion after channel estimation. That is, the terminal 820 determines the filter set based on channel information. Namely, the terminal 820 and the base station 810 share a plurality of predefined filter sets, and the terminal 820 determines at least one filter set to use for communication. For the channel estimation, the terminal 820 can use a sync signal, a preamble, an RS, a pilot, and so on. Further, the terminal 820 determines a group filter interleaving pattern to apply for the STBC. In other words, the terminal 820 selects a plurality of patterns to use for the STBC in the selected filter set. In so doing, the number of the patterns selected as the group interleaving pattern can vary according to a type of the STBC. For example, when 2×1 STBC is performed, one of a first group interleaving pattern 2191 including a pattern 2171 and a pattern 2172, a second group interleaving pattern 2192 including a pattern 2173 and a pattern 2174, and a third group interleaving pattern 2193 including a pattern 2175 and a pattern 2176 can be selected as shown in FIG. 21A. Alternatively, when 3×1 STBC is performed, one of a fourth group interleaving pattern 2194 including a pattern 2171, a pattern 2172, and a pattern 2173, and a fifth group interleaving pattern 2195 including a pattern 2174, a pattern 2175, and a pattern 2176 can be selected as shown in FIG. 21B.

In operation 1903, the terminal 820 sends a GFII to the base station 810. That is, the terminal 820 transmits control information indicating the group interleaving pattern selected in operation 1901. In other words, the terminal 820 transmits the control information indicating the set of the patterns including the multiple patterns for the filters. The GFII can include a combination of information indicating the filter set and information indicating the patterns for the filters of the filter set, or include one index indicating the combination of the filter set and the patterns. Accordingly, the base station 810 can identify the patterns of the series of the patterns to use in the STBC for a signal to the terminal 820.

In operation 1905, the base station 810 transmits data according to a time slot using the interleaving filter sets based on the GFII. That is, the base station 810 transmits STBC data symbols using the patterns of the filter set indicated by the control information from the terminal 820. Specifically, the base station 810 STBCs the data symbols, generates FBMC symbols using the patterns of the filter set, and then sends a data signal including the FBMC symbols. For example, the data signal can be constructed as shown in FIG. 22 or FIG. 23. Before doing so, the base station 810 can determine whether GC setting is required according to whether the terminal 820 and other terminal perform the filter interleaving, and send a GCI.

In operation 1907, the terminal 820 detects data based on the filter set determined by the group filter interleaving. That is, the terminal 820 receives the data signal and restores the data symbols using the patterns of the filter set selected in operation 1901. Specifically, the terminal 820 receives the data signal including the FBMC symbols, detects the data symbols from the FBMC symbols using the patterns of the filter set, and then performs space-time coding. Before doing so, the terminal 820 can receive the information indicating whether the GC setting is necessary, that is, the GCI.

Figure 20:
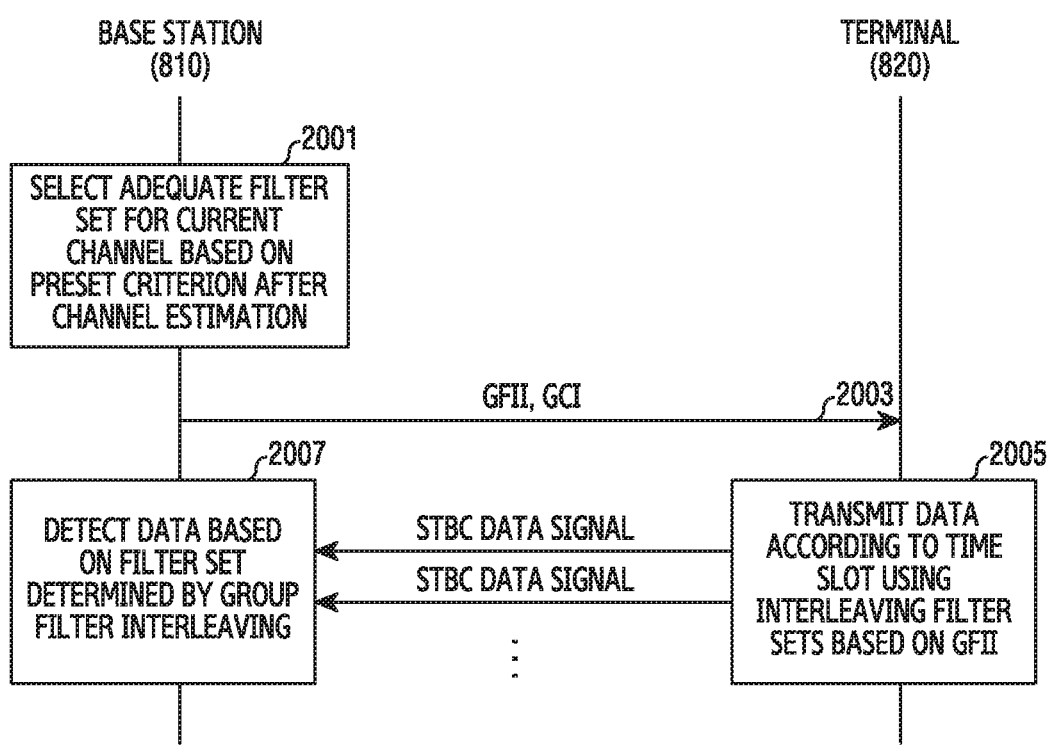
FIG. 20 depicts an uplink communication process according to filter interleaving based STBC in a wireless communication system according to an embodiment of the present invention.

FIG. 20 depicts a UL communication process according to filter interleaving based STBC in a wireless communication system according to an embodiment of the present invention. FIG. 20 illustrates an operating method of the base station 810 and the terminal 820.

Referring to FIG. 20, in operation 2001, the base station 810 determines an adequate filter set for a current channel based on a preset criterion after channel estimation. That is, the base station 810 determines the filter set based on channel information. Namely, the base station 810 and the terminal 820 share a plurality of predefined filter sets, and the base station 810 determines at least one filter set to use for communication. For the channel estimation, the base station 810 can use a sounding signal, an RS, a pilot, and so on. Further, the base station 810 determines a group filter interleaving pattern to apply for the STBC. In other words, the base station 810 selects a plurality of patterns to use for the STBC in the selected filter set. In so doing, the number of the patterns selected as the group interleaving pattern can vary according to the type of the STBC. For example, when 2×1 STBC is performed, one of the first group interleaving pattern 2191 including the pattern 2171 and the pattern 2172, the second group interleaving pattern 2192 including the pattern 2173 and the pattern 2174, and the third group interleaving pattern 2193 including the pattern 2175 and the pattern 2176 can be selected as shown in FIG. 21B. Alternatively, when 3×1 STBC is performed, one of the fourth group interleaving pattern 2194 including the pattern 2171, the pattern 2172, and the pattern 2173, and the fifth group interleaving pattern 2195 including the pattern 2174, the pattern 2175, and the pattern 2176 can be selected as shown in FIG. 21B. Also, the base station 810 can determine whether GC setting is needed, according to whether the terminal 810 and other terminal perform the filter interleaving.

In operation 2003, the base station 810 sends a GFII and a GCI to the terminal 820. That is, the base station 810 transmits control information indicating the group interleaving pattern selected in operation 2001, and control information indicating whether the GC setting is needed. In other words, the base station 810 transmits the control information indicating the set of the patterns including the multiple patterns for the filters. The GFII can include a combination of information indicating the filter set and information indicating the patterns for the filters of the filter set, or include one index indicating the combination of the filter set and the patterns. Accordingly, the terminal 820 can identify the patterns of the series of the patterns to use in the STBC for a signal to the base station 810.

In operation 2005, the terminal 820 transmits data according to a time slot using the interleaving filter sets based on the GFII. That is, the terminal 820 transmits STBC data symbols using the patterns of the filter set indicated by the control information from the base station 810. Specifically, the terminal 820 STBCs the data symbols, generates FBMC symbols using the patterns of the filter set, and then sends a data signal including the FBMC symbols. For example, the data signal can be constructed as shown in FIGS. 22A and 22B or FIGS. 23A, 23B and 23C.

In operation 2007, the base station 810 detects data based on the filter set determined by the group filter interleaving. That is, the base station 810 receives the data signal and restores the data symbols using the patterns of the filter set selected in operation 2001. Specifically, the base station 810 receives the data signal including the FBMC symbols, detects the data symbols from the FBMC symbols using the patterns of the filter set, and then performs space-time coding.

In the STBC based on the filter interleaving as explained above, the STBC signals can be arranged as shown in FIGS. 22A and 22B and FIGS. 23A, 23B and 23C. While FIGS. 22A and 22B and FIGS. 23A, 23B and 23C illustrate two filters used, three or more filters can be applied similarly.

Figure 22A:
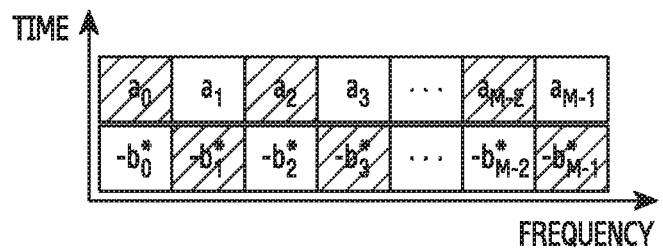
FIGS. 22A and 22B depict an example of filter-interleaved 2×1 STBC signals in a wireless communication system according to an embodiment of the present invention.
Figure 22B:
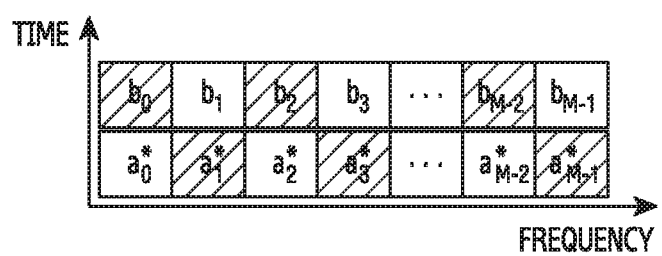

FIGS. 22A and 22B depicts an example of filter-interleaved 2×1 STBC signals in a wireless communication system according to an embodiment of the present invention. FIGS. 22A and 22B illustrate a case where an Alamouti scheme is applied. FIG. 22A illustrates FBMC symbols transmitted over a first antenna, and FIG. 22B illustrates FBMC symbols transmitted over a second antenna. As shown in FIGS. 22A and 22B, filters applied to respective subcarriers between adjacent FBMC symbols are different.

Figure 23A:
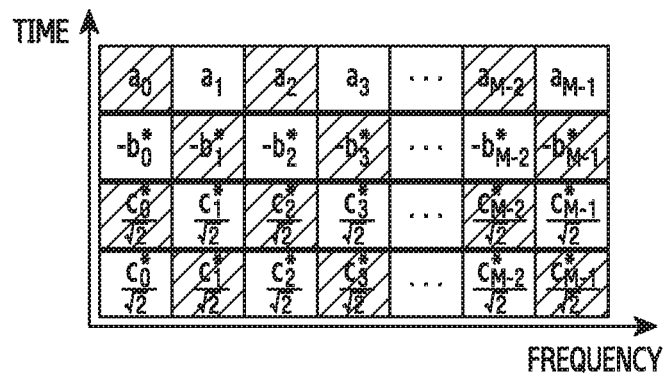
FIGS. 23A, 23B and 23C depict an example of filter-interleaved 3×1 STBC signals in a wireless communication system according to an embodiment of the present invention.
Figure 23B:
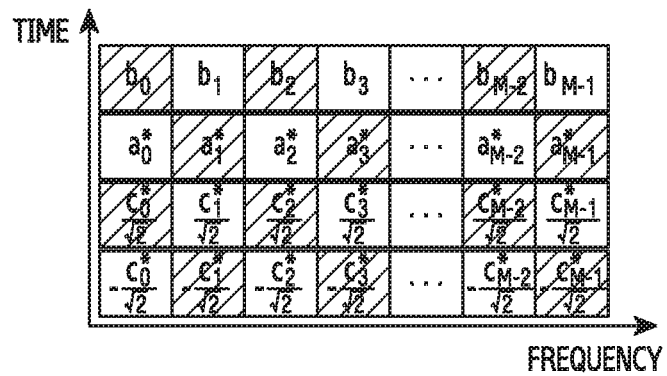
Figure 23C:
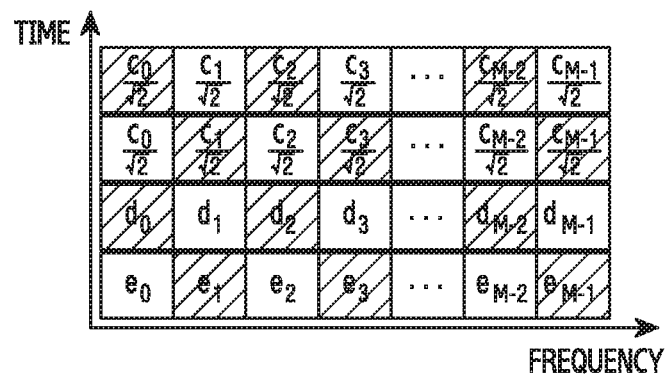

FIGS. 23A, 23B and 23C depicts an example of filter-interleaved 3×1 STBC signals in a wireless communication system according to an embodiment of the present invention. FIGS. 23A, 23B and 23C illustrate a case where an Orthogonal STBC (OSTBC) scheme is applied. FIG. 23A illustrates FBMC symbols transmitted over a first antenna, FIG. 23B illustrates FBMC symbols transmitted over a second antenna, and FIG. 23C illustrates FBMC symbols transmitted over a third antenna. As shown in FIGS. 23A, 23B and 23C, filters applied to respective subcarriers between adjacent FBMC symbols are different from each other.

A system according to an embodiment applies a scheme which repeatedly transmits the same data for a terminal located in a cell edge. Also, Machine to Machine (M2M) communication can perform a repetition transmission scheme. Hence, when the repetition transmission is conducted due to various reasons including a cell edge terminal and an M2M terminal, the filter interleaving can be applied. The interleaved filter sets are used in time slots additionally used to repeatedly transmit the same signal, and the GFII can be used similarly to the STBC. A process for conducting the repetition transmission aforementioned is shown in FIG. 24 and FIG. 25.

Figure 24:
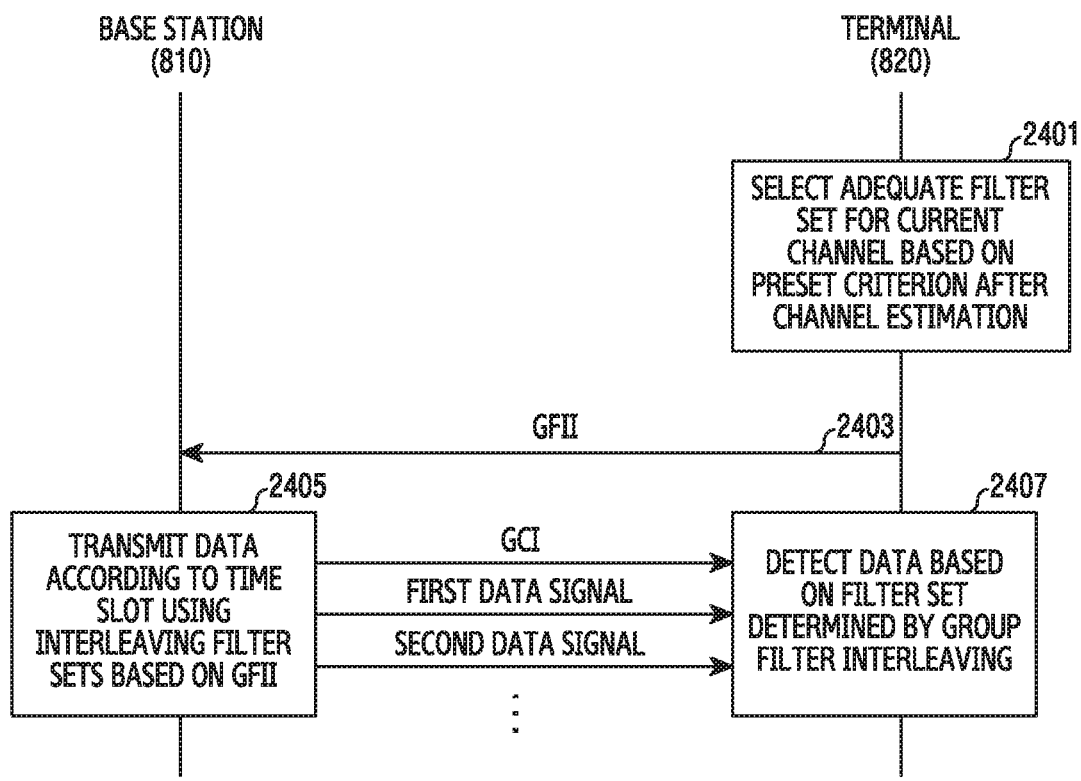
FIG. 24 depicts a downlink communication process according to filter interleaving based repetition transmission in a wireless communication system according to an embodiment of the present invention.
Figure 25:
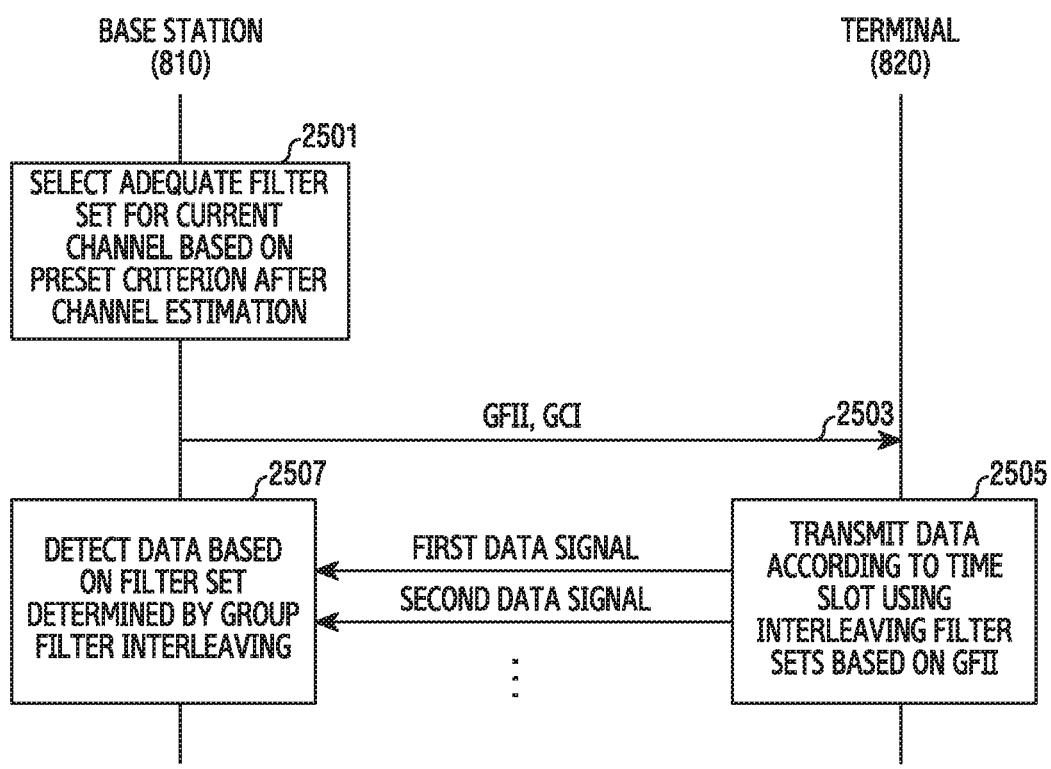
FIG. 25 depicts an uplink communication process according to filter interleaving based repetition transmission in a wireless communication system according to an embodiment of the present invention.

FIG. 24 depicts a DL communication process according to filter interleaving based repetition transmission in a wireless communication system according to an embodiment of the present invention. FIG. 24 illustrates an operating method of the base station 810 and the terminal 820.

Referring to FIG. 24, in operation 2401, the terminal 820 determines an adequate filter set for a current channel based on a preset criterion after channel estimation. That is, the terminal 820 determines the filter set based on channel information. Namely, the terminal 820 and the base station 810 share a plurality of predefined filter sets, and the terminal 820 determines at least one filter set to use for communication. For the channel estimation, the terminal 820 can use a sync signal, a preamble, an RS, a pilot, and so on. Further, the terminal 820 determines a group filter interleaving pattern to apply for the repetition transmission. In other words, the terminal 820 selects a plurality of patterns to use for the repetition transmission in the selected filter set.

In operation 2403, the terminal 820 sends a GFII to the base station 810. That is, the terminal 820 transmits control information indicating the group interleaving pattern selected in operation 2401. In other words, the terminal 820 transmits the control information indicating the set of the patterns including the multiple patterns for the filters. The GFII can include a combination of information indicating the filter set and information indicating the patterns for the filters of the filter set, or include one index indicating the combination of the filter set and the patterns. Accordingly, the base station 810 can identify the patterns of the series of the patterns to use in the repetition transmission for a signal to the terminal 820.

In operation 2405, the base station 810 transmits data according to a time slot using the interleaving filter sets based on the GFII. That is, the base station 810 transmits data symbols using the patterns of the filter set indicated by the control information from the terminal 820. Specifically, the base station 810 repeatedly generates FBMC symbols including the same data using the patterns of the filter set, and then sends data signals including the FBMC symbols. Before doing so, the base station 810 can determine whether GC setting is required according to whether the terminal 820 and other terminal perform the filter interleaving, and send a GCI.

In operation 2407, the terminal 820 detects data based on the filter set determined by the group filter interleaving. That is, the terminal 820 receives the data signal and restores the data symbols using the patterns of the filter set selected in operation 2401. Specifically, the terminal 820 receives the data signal including the FBMC symbols, detects the data symbols from the FBMC symbols using the patterns of the filter set, and then performs space-time coding. Before doing so, the terminal 820 can receive the information indicating whether the GC setting is necessary, that is, the GCI.

FIG. 25 depicts an UL communication process according to filter interleaving based repetition transmission in a wireless communication system according to an embodiment of the present invention. FIG. 25 illustrates an operating method of the base station 810 and the terminal 820.

Referring to FIG. 25, in operation 2501, the base station 810 determines an adequate filter set for a current channel based on a preset criterion after channel estimation. That is, the terminal 820 determines the filter set based on channel information. Namely, the base station 810 and the terminal 820 share a plurality of predefined filter sets, and the base station 810 determines at least one filter set to use for communication. For the channel estimation, the base station 810 can use a sounding signal, an RS, a pilot, and so on. Further, the base station 810 determines a group filter interleaving pattern to apply for the repetition transmission. In other words, the base station 810 selects a plurality of patterns to use for the repetition transmission in the selected filter set. Also, the base station 810 can determine whether GC setting is needed, according to whether the terminal 810 and other terminal perform the filter interleaving.

In operation 2503, the base station 810 sends a GFII and a GCI to the terminal 820. That is, the base station 810 transmits control information indicating the group interleaving pattern selected in operation 2501 and control information indicating whether the GC setting is required. In other words, the base station 810 transmits the control information indicating the set of the patterns including the multiple patterns for the filters. The GFII can include a combination of information indicating the filter set and information indicating the patterns for the filters of the filter set, or include one index indicating the combination of the filter set and the patterns. Accordingly, the terminal 820 can identify the patterns of the series of the patterns to use in the repetition transmission of a signal to the base station 810.

In operation 2505, the terminal 820 transmits data according to a time slot using the interleaving filter sets based on the GFII. That is, the terminal 820 transmits data symbols using the patterns of the filter set indicated by the control information from the base station 810. Specifically, the terminal 820 repeatedly generates FBMC symbols including the same data using the patterns of the filter set, and then sends data signals including the FBMC symbols.

In operation 2507, the base station 810 detects data based on the filter set determined by the group filter interleaving. That is, the base station 810 receives the data signal and restores the data symbols using the patterns of the filter set selected in operation 2501. Specifically, the base station 810 receives the data signal including the FBMC symbols, detects the data symbols from the FBMC symbols using the patterns of the filter set, and then performs the space-time coding.

Figure 26A:
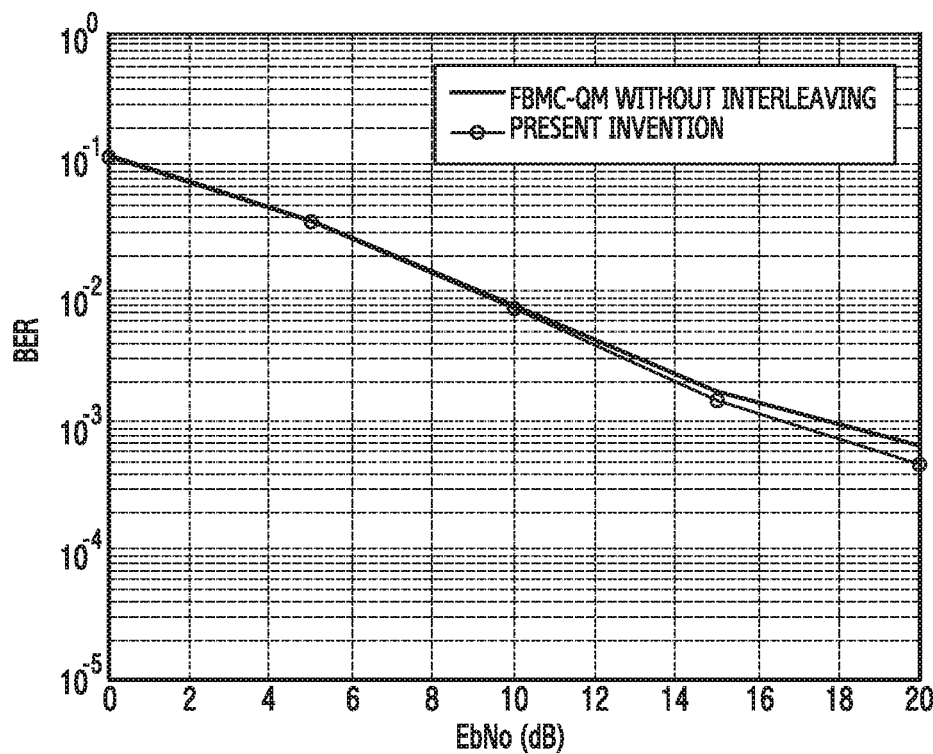
FIGS. 26A and 26B depict simulation results in a wireless communication system according to an embodiment of the present invention.
Figure 26B:
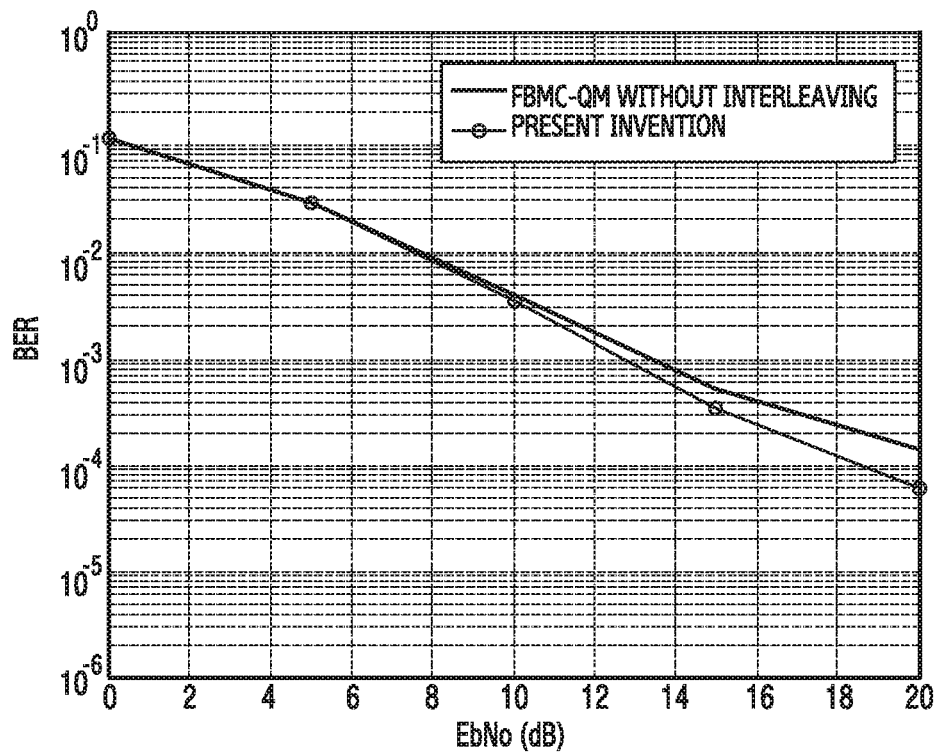

FIGS. 26A and 26B depict simulation results in a wireless communication system according to an embodiment of the present invention. FIG. 26A shows BER change for $E_b/N_0$ as the simulation results in case of 2×1 STBC based on the Alamouti scheme of FIGS. 22A and 22B, and FIG. 26B shows BER change for $E_b/N_0$ as the simulation results in case of 3×1 STBC based on the STBC scheme of FIGS. 23A, 23B and 23C.

In the simulation of FIGS. 26A and 26B, an International Telecommunication Union (ITU) vehicular channel model is applied. A modulation scheme is set to 4-QAM, the number of subcarrier is set to 512, the number of subblocks is set to 4, and a filter order is set to 4. Referring to FIGS. 26A and 26B, in the system according to an embodiment of the present invention, since the transmitting node uses a different filter per time slot through the filter interleaving, BER performance degradation due to the filter characteristic difference is mitigated. Thus, the gain is also expected in other embodiments than the STBC.

The methods according to embodiments described in the claims or the specification of the present invention can be implemented in hardware, software, or a combination of hardware and software.

As for the software implementation, a computer-readable storage medium storing one or more programs (software modules) can be provided. One or more programs stored in the computer-readable storage medium can be configured for execution by one or more processors of an electronic device. One or more programs can include instructions for enabling the electronic device to execute the methods according to the embodiments described in the claims or the specification of the present invention.

Such a program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs can be stored to a memory combining part or all of those recording media. Also, a plurality of memories may be included.

The programs can be stored in an attachable storage device accessible via a communication network such as Internet, Intranet, Local Area Network (LAN), Wide LAN (WLAN), or Storage Area Network (SAN), or a communication network by combining these networks. Such a storage device can access an apparatus which realizes an embodiment of the present invention through an external port. Also, a separate storage device may access the apparatus which realizes an embodiment of the present invention on the communication network.

In the above-described various embodiments of the present invention, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element and the elements expressed in the singular form may be configured as a plurality of elements.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for operating a transmitting node in a wireless communication system, the method comprising:
   receiving, from a receiving node, control information indicating a set of filter interleaving patterns including a first filter pattern and a second filter pattern;
   transmitting, to the receiving node, a first filter bank multi-carrier (FBMC) symbol generated by applying filters to subcarriers based on the first filter pattern; and
   transmitting, to the receiving node, a second FBMC symbol generated by applying the filters to the subcarriers based on the second filter pattern.

2. The method of claim 1, further comprising:
   wherein the control information further comprises at least one index indicating a combination of filter set and filter patterns.

3. The method of claim 1, further comprising:
transmitting, to the receiving node, control information indicating whether a guard carrier is set according to filter interleaving.

4. The method of claim 1, further comprising:
wherein the control information further comprises control information indicating whether a guard carrier is set according to filter interleaving performed.

5. The method of claim 1, further comprising:
wherein the control information further comprises at least one of control information indicating the second filter pattern and control information indicating a set of patterns comprising the first filter pattern and the second filter pattern.

6. The method of claim 1, wherein, in the first FBMC symbol and the second FBMC symbol, a filter applied to at least one carrier is a different filter.

7. The method of claim 1, wherein the first FBMC symbol comprises an initial transmit packet, and the second FBMC symbol comprises a retransmit packet.

8. The method of claim 1, wherein the first FBMC symbol and the second FBMC symbol comprise at least one of data symbols space-time coded and the same data symbols for repetition transmission.

9. A method for operating a receiving node in a wireless communication system, the method comprising:
transmitting, to a transmitting node, control information indicating a set of filter interleaving patterns including a first filter pattern and a second filter pattern;
receiving, from the transmitting node, a first filter bank multi-carrier (FBMC) symbol generated by applying filters to subcarriers based on the first filter pattern; and
receiving, from the transmitting node, a second FBMC symbol generated by applying the filters to the subcarriers based on the second filter pattern.

10. The method of claim 9, further comprising:
wherein the control information further comprises at least one index indicating a combination of filter set and filter patterns.

11. The method of claim 9, further comprising:
receiving, from the transmitting node, control information indicating whether a guard carrier is set according to filter interleaving.

12. The method of claim 9, further comprising:
wherein the control information further comprises control information indicating whether a guard carrier is set according to filter interleaving performed.

13. The method of claim 9, further comprising:
wherein the control information further comprises at least one of control information indicating the second filter pattern and control information indicating a set of patterns comprising the first filter pattern and the second filter pattern.

14. The method of claim 9, wherein, in the first FBMC symbol and the second FBMC symbol, a filter applied to at least one carrier is a different filter.

15. The method of claim 9, wherein the first FBMC symbol comprises an initial transmit packet, and
the second FBMC symbol comprises a retransmit packet.

16. The method of claim 9, wherein the first FBMC symbol and the second FBMC symbol comprise at least one of data symbols space-time coded and the same data symbols for repetition transmission.

17. An apparatus for operating a transmitting node in a wireless communication system, the apparatus comprising:
at least one processor; and
a transceiver configured to:
receive, from a receiving node, control information indicating a set of filter interleaving patterns including a first filter pattern and a second filter pattern;
transmit, to the receiving node, a first filter bank multi-carrier (FBMC) symbol generated by applying filters to subcarriers based on the first filter pattern; and
transmit, to the receiving node, a second FBMC symbol generated by applying the filters to the subcarriers based on the second filter pattern.

18. The apparatus of claim 17, wherein the control information further comprises at least one index indicating a combination of filter set and filter patterns.

19. The apparatus of claim 17, wherein the transceiver is further configured to transmit, to the receiving node, control information indicating whether a guard carrier is set according to filter interleaving.

20. The apparatus of claim 17, wherein, in the first FBMC symbol and the second FBMC symbol, a filter applied to at least one carrier is a different filter.

* * * * *